United States Patent
Shiraishi

(10) Patent No.: US 7,869,111 B2
(45) Date of Patent: Jan. 11, 2011

(54) OPTICAL SCANNER, IMAGE FORMING DEVICE, OPTICAL SCANNING METHOD

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 704 days.

(21) Appl. No.: 11/755,115

(22) Filed: May 30, 2007

(65) Prior Publication Data

US 2007/0279723 A1 Dec. 6, 2007

(30) Foreign Application Priority Data

May 31, 2006 (JP) .............................. 2006-151306

(51) Int. Cl.
 *G02B 26/08* (2006.01)
(52) U.S. Cl. ............... 359/216.1; 359/204.1; 359/205.1
(58) Field of Classification Search ... 359/204.1–208.2, 359/216.1–219.2; 347/233, 243, 259–261
 See application file for complete search history.

(56) References Cited

U.S. PATENT DOCUMENTS

| 5,850,306 A | 12/1998 | Fukutome et al. |
| 6,049,350 A * | 4/2000 | Yamaguchi ................. 347/241 |
| 6,839,156 B2 * | 1/2005 | Eom et al. ................ 359/201.1 |

FOREIGN PATENT DOCUMENTS

| CN | 1160858 | 10/1997 |
| JP | 63-273814 | 11/1988 |
| JP | 11-218991 | 8/1999 |
| JP | 2000-002846 | 1/2000 |

* cited by examiner

*Primary Examiner*—James Phan
(74) *Attorney, Agent, or Firm*—Turocy & Watson, LLP

(57) ABSTRACT

A technique capable of achieving reduction in space of allocating an optical system and improvement of an optical characteristic of a scan light in an optical scanner that scans a light flux from a light source on each of a photosensitive surface of a plurality of photoconductors in a main-scanning direction is provided.

An optical scanner comprising: a polygon mirror 80; a pre-deflection optical system 7; and a post-deflection optical system A, wherein the post-deflection optical system A includes a common optical element having a smooth surface acting on all the light fluxes reflected and deflected by each of the plurality of reflecting surfaces in the polygon mirror 80, the common optical element that applies power to the light flux reflected and deflected by the polygon mirror 80 and introduced to each of the plurality of photoconductors, so as to make the light flux introduced to the photosensitive surface by the post-deflection optical system A to have a predetermined optical characteristic on the photosensitive surface depending on an incident position of the light flux.

18 Claims, 31 Drawing Sheets

POLYGON MIRROR
REFLECTING SURFACE

POLYGON MIRROR REFLECTING SURFACE
POLYGON MOTOR COVER GLASS

POLYGON MIRROR REFLECTING SURFACE

FIG.41

| fθ1 INCIDENT SURFACE | fθ1 EXIT SURFACE | fθ2 INCIDENT SURFACE | fθ2 EXIT SURFACE | EVALUATION FUNCTION |
|---|---|---|---|---|
| CURVATURE CHANGE | CURVATURE CHANGE | CURVATURE CHANGE | CURVATURE CHANGE | 4.86E+28 |
| CURVATURE CHANGE | CURVATURE CHANGE | CONSTANT CURVATURE | CONSTANT CURVATURE | 9.43E+28 |
| CONSTANT CURVATURE | CURVATURE CHANGE | CONSTANT CURVATURE | CURVATURE CHANGE | 2.89E+29 |
| CURVATURE CHANGE | CONSTANT CURVATURE | CONSTANT CURVATURE | CURVATURE CHANGE | 5.81E+29 |
| CONSTANT CURVATURE | CURVATURE CHANGE | CURVATURE CHANGE | CONSTANT CURVATURE | 7.17E+29 |
| CURVATURE CHANGE | CONSTANT CURVATURE | CURVATURE CHANGE | CONSTANT CURVATURE | 1.77E+30 |
| CONSTANT CURVATURE | CONSTANT CURVATURE | CURVATURE CHANGE | CURVATURE CHANGE | 3.10E+30 |

OPTICAL SCANNER, IMAGE FORMING DEVICE, OPTICAL SCANNING METHOD

BACKGROUND OF THE INVENTION

1. Field of the Invention

The present invention relates to an optical scanner that scans a light flux from a light source to a photosensitive surface of each of a plurality of photoconductors in a main-scanning direction. In particular, the present invention relates to a technique of achieving reduction in space for allocation of an optical system and improvement of an optical characteristic of scan light.

2. Description of the Related Art

Conventionally, in relation to an optical scanning technique that scans a light flux from a light source to a photosensitive surface of each of a plurality of photoconductors in a main-scanning direction, there has been disclosed an image forming device that forms an image such as an electrostatic latent image on the photoconductors by irradiation of a light beam. The image forming device sets a plurality of reflecting surfaces in a rotational deflector that scans the light beam to the plurality of photoconductors to have an inclination angle different from one another with respect to a rotational axis, and scans the different photoconductor for each of the reflecting surfaces having the inclination angle different from one another (for example, refer to Patent Document 1: Jpn. Pat. Appln. Publication No. 2000-2846 and Patent Document 2: Jpn. Pat. Appln. Publication No. 11-218991).

In the conventional art configured as described above, a polygon mirror having the reflecting surfaces each having a reflecting angle different from one another is used, so that both kinds of scanning, that is, scanning by and switchover of a light path of a laser beam, can be carried out by a rotational operation of a polygon mirror. Therefore, lowering of cost by reduction in the number of items of parts and by reduction in movable parts, and printing with high precision by simplification of control operation can be achieved.

In the conventional art described above, there also is an invention in which a cylinder lens is arranged in a pre-deflection optical system (refer to Patent Document 1). In this invention, light is considered to be converged in the vicinity of a reflecting surface of the deflector in a sub-scanning direction, and in the post-deflection optical system, the reflecting surface and the image surface of the deflector are considered to be made to have a substantially conjugate relationship in the sub-scanning direction so as to provide a surface tilt correcting function. On the other hand, there is a configuration where the cylinder lens is not included in the pre-deflection optical system. In such a configuration, the post-deflection optical system is considered not to have the surface tilt correcting function (for example, refer to Patent Document 2 and Patent Document 3: Jpn. Pat. Appln. Publication No. 63-273814).

Conventionally, in a case where each of the reflecting surfaces of the polygon mirror is made to have an angle different from one another and a light beam is imaged onto each exposure target part by the post-deflection optical system that has the surface tilt correction function, each of the light beams deflected on each of the surfaces of the polygon mirror has been imaged in an optical part different from one another. In this case, as much as there is a need to secure certain space between the optical parts, there is a need to make the inclination angle applied to each of the reflecting surfaces of the polygon mirror large, and the space for allocating the optical system in the sub-scanning direction is enlarged.

In addition, by securing the certain space between the optical parts, generation of an asymmetric wave aberration which becomes larger when the inclination angle applied to each of the reflecting surfaces of the polygon mirror is large becomes difficult to restrict. This has led to deterioration in an imaging characteristic.

Further, in a case where the post-deflection optical system does not have the surface tilt correcting function, an allowable amount of surface tilt of each of the reflecting surfaces of the polygon mirror becomes extremely small, and there is a problem that manufacturing cost of the polygon mirror significantly increases. In addition, in a case where the lens does not have the surface tilt correcting function and the configuration is such that light beam passes through the common lens from each of the reflecting surfaces of the polygon mirror to which an angle is applied, a scan line is curved and overlapping of colors with high precision (registration) cannot be carried out. In particular, in a case where a full color image is formed by using four sets of beams in order to form four latent images, an image has been significantly deteriorated due to color shift.

SUMMARY OF THE INVENTION

An object of an embodiment of the present invention is to provide a technique capable of achieving reduction in space for allocating an optical system and improvement in an optical characteristic of scan light in an optical scanner that scans a light flux from a light source on a photosensitive surface of each of a plurality of photoconductors in a main-scanning direction.

In order to achieve the above object, according to an aspect of the present invention, there is provided an optical scanner that can scan a light flux from a light source to a photosensitive surface of each of a plurality of photoconductor in a main-scanning direction, comprising: a rotational deflector that reflects and deflects an incident light flux by a plurality of reflecting surfaces arranged corresponding to the plurality of photoconductors in a rotational direction to scan the incident light flux in the main-scanning direction, the rotational deflector in which an inclination angle of the plurality of reflecting surfaces with respect to a rotational axis of the rotational deflector is set to an angle depending on the photoconductor to which each of the reflecting surfaces corresponds; a pre-deflection optical system that shapes the light from the light source into a light flux having a predetermined cross-sectional shape and introduces the light flux to the rotational deflector, and also converges the light flux in a sub-scanning direction in the vicinity of the reflecting surfaces of the rotational deflector; and a post-deflection optical system that introduces the light flux reflected and deflected by each of the plurality of reflecting surfaces in the rotational deflector to the photosensitive surface of the photoconductor corresponding to each of the reflecting surfaces, wherein the post-deflection optical system includes a common (commonly-used) optical element that applies power to a light flux reflected and deflected in the rotational deflector and introduced to each of the plurality of photoconductors, so as to make the light flux introduced to the photosensitive surface by the post-deflection optical system to have a predetermined optical characteristic on the photosensitive surface depending on an incident position of the light flux.

In addition, according to an aspect of the present invention, there is provided an image forming device comprising: the optical scanner configured as described above; a photoconductor that has an electrostatic latent image formed thereon by a light flux scanned by the optical scanner; and a developing unit that develops the electrostatic latent image formed on the photoconductor.

In addition, according to an aspect of the present invention, there is provided an optical scanner that can scan a light flux from a light source to a photosensitive surface of each of a plurality of photoconductors in a main-scanning direction comprising: a light flux deflecting unit that reflects and deflects an incident light flux by a plurality of reflecting surfaces arranged corresponding to the plurality of photoconductors in a rotational direction to scan the incident light flux in the main-scanning direction, the light flux deflecting unit in which an inclination angle of the plurality of reflecting surfaces with respect to a rotational axis of the light flux deflecting unit is set to an angle depending on the photoconductor to which each of the reflecting surfaces corresponds; a pre-deflection light guiding unit that shapes the light from the light source into a light flux having a predetermined cross-sectional shape and introduces the light flux to the light flux deflecting unit, and also converges the light flux in a sub-scanning direction in the vicinity of the reflecting surfaces of the light flux deflecting unit; and a post-deflection light guiding unit that introduces the light flux reflected and deflected by each of the plurality of reflecting surfaces in the light flux deflecting unit to the photosensitive surface of the photoconductor corresponding to each of the reflecting surfaces, wherein the post-deflection light guiding unit includes a common (commonly-used) optical element that applies power to a light flux reflected and deflected in the light flux deflecting unit and introduced to each of the plurality of photoconductors, so as to make the light flux introduced to the photosensitive surface by the post-deflection light guiding unit to have a predetermined optical characteristic on the photosensitive surface depending on an incident position of the light flux.

Further, according to an aspect of the present invention, there is provided an optical scanning method that scans a light flux from a light source to a photosensitive surface of each of a plurality of photoconductors in a main-scanning direction, comprising: shaping the light from the light source into a light flux having a predetermined cross-sectional shape to introduce the light flux to the rotational deflector, and also converging the light flux in a sub-scanning direction in the vicinity of the reflecting surfaces of the rotational deflector; reflecting and deflecting an incident light flux by means of the rotational deflector which has a plurality of reflecting surfaces arranged corresponding to the plurality of photoconductors in a rotational direction, and in which an inclination angle of the plurality of reflecting surfaces with respect to a rotational axis of the rotational deflector is set to an angle depending on the photoconductor to which each of the reflecting surfaces corresponds, to scan the incident light flux in the main-scanning direction; and applying power to the light flux reflected and deflected by the rotational deflector and introduced to each of the plurality of photoconductors by means of a common (commonly-used) optical element so as to make the light flux introduced to the photosensitive surface to have a predetermined optical characteristic on the photosensitive surface depending on an incident position of the light flux, and introducing the light flux to which the power is applied by the common (commonly-used) optical element to the photosensitive surface of the photoconductor corresponding to each of the reflecting surfaces.

BRIEF DESCRIPTION OF THE DRAWINGS

FIG. 41 is a view showing a result of examination on which lens surface of the fθ1 lens and the fθ2 lens a free-form surface having power acting on all the light fluxes guided to the plurality of photoconductors needs to be formed;

DETAILED DESCRIPTION OF THE PREFERRED EMBODIMENTS

Hereinafter, embodiments of the present invention will be described with reference to the accompanying drawings.

First Embodiment

Figure 1:
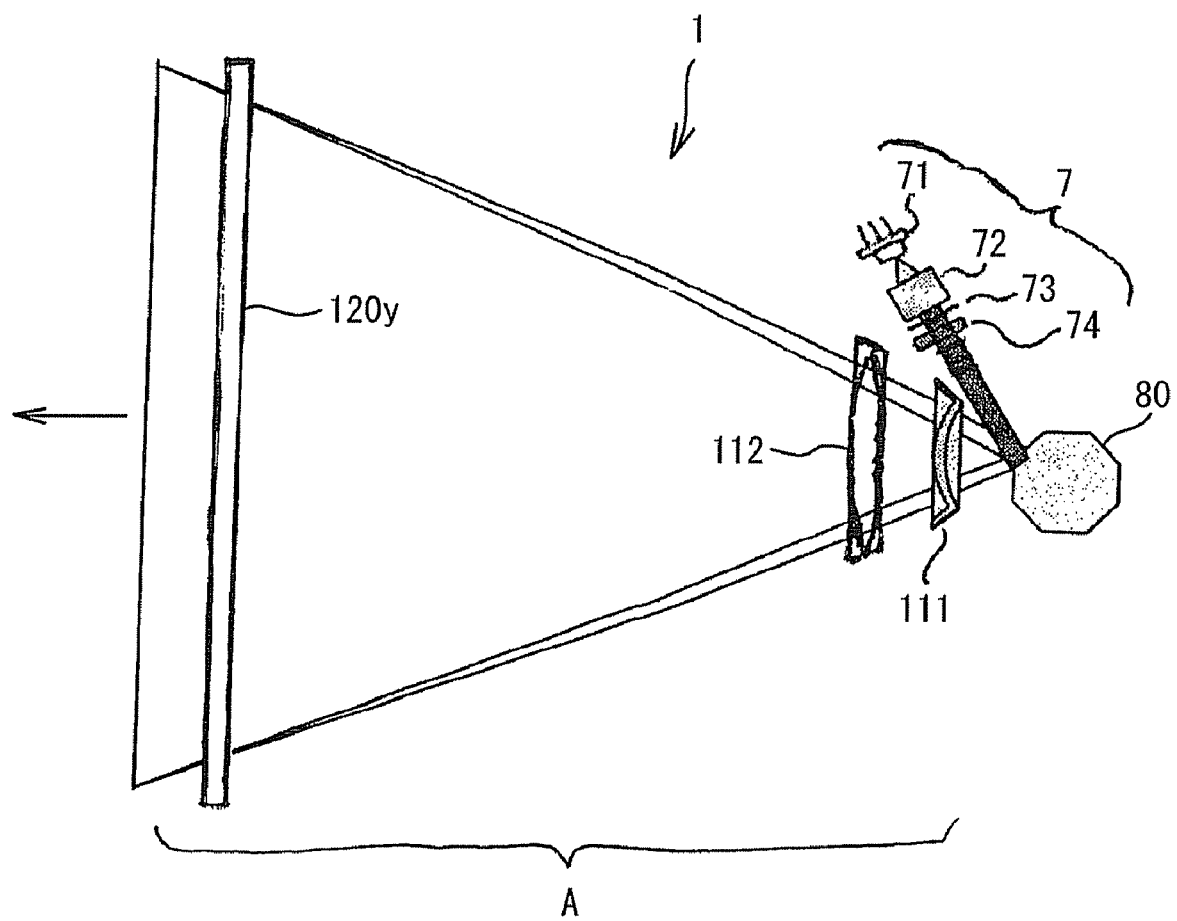
FIG. 1 is a plan view showing a configuration of an optical system of an optical scanner according to a first embodiment of the present invention in a state where turning back by a mirror is extended.
Figure 2:
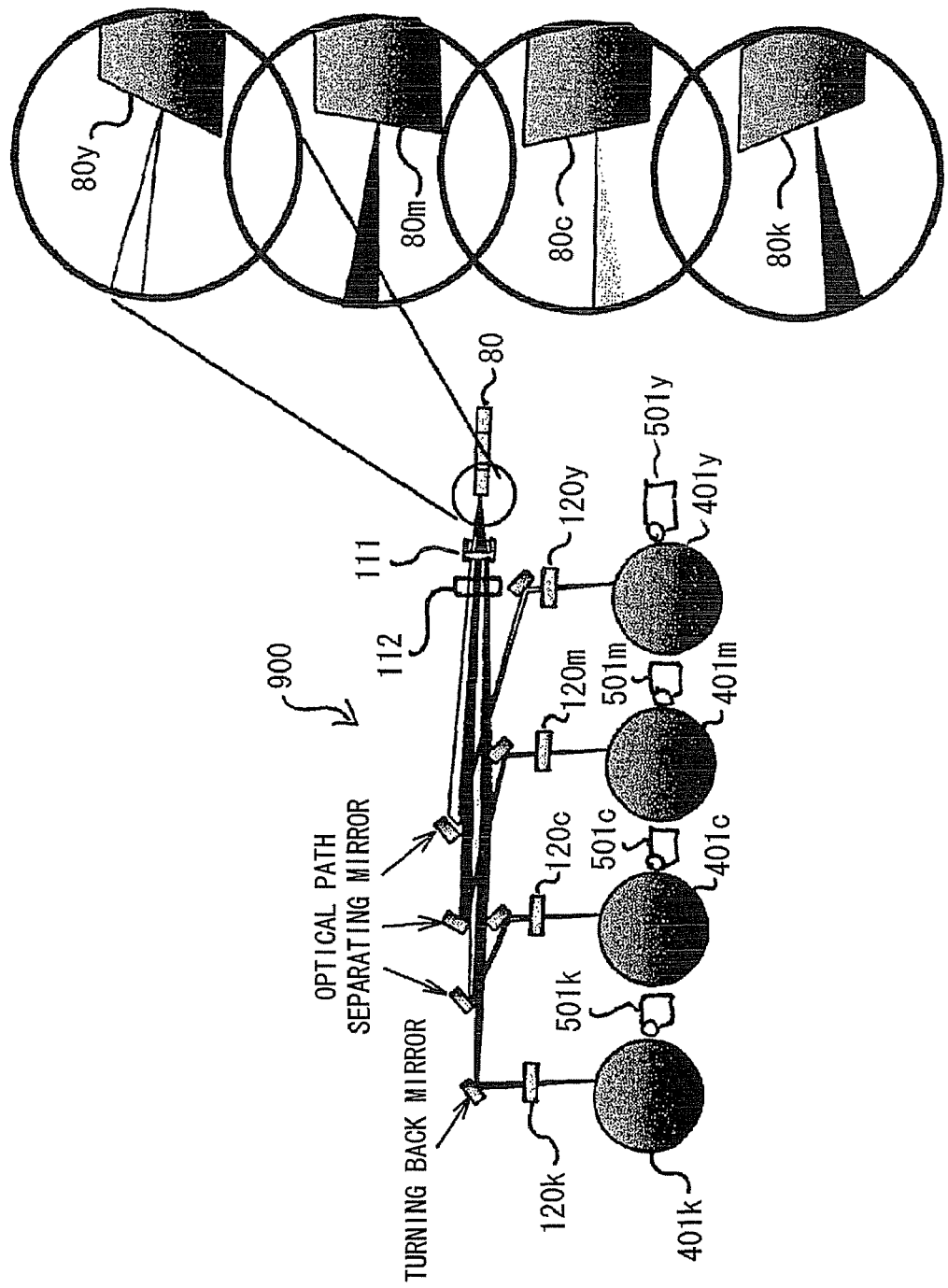
FIG. 2 is a view showing a schematic configuration of an image forming device including the optical scanner according to the first embodiment.
Figure 3:
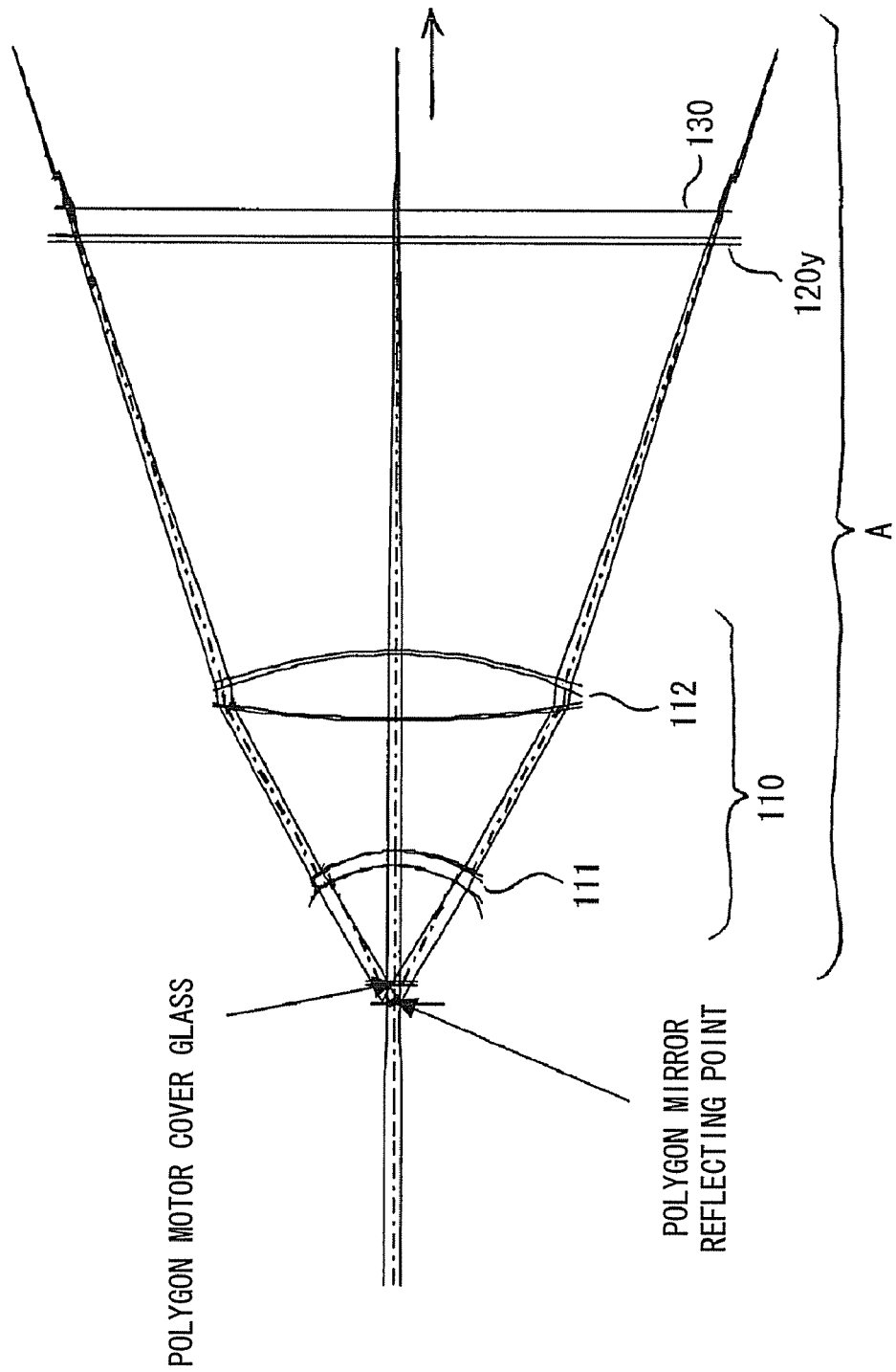
FIG. 3 is a view showing an optical path in the optical system in the optical scanner according to the first embodiment.
Figure 4:
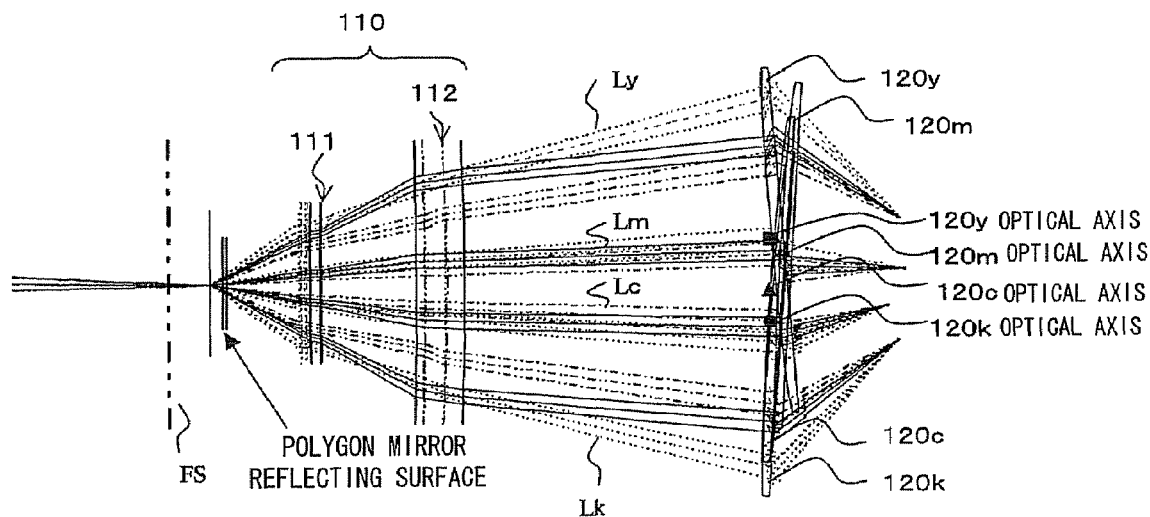
FIG. 4 is a view showing an optical path of a light flux guided to a plurality of photoconductors in the optical scanner according to the first embodiment in an enlarged manner in a sub-scanning direction in a state where the turning back by the mirror is extended.
Figure 5:
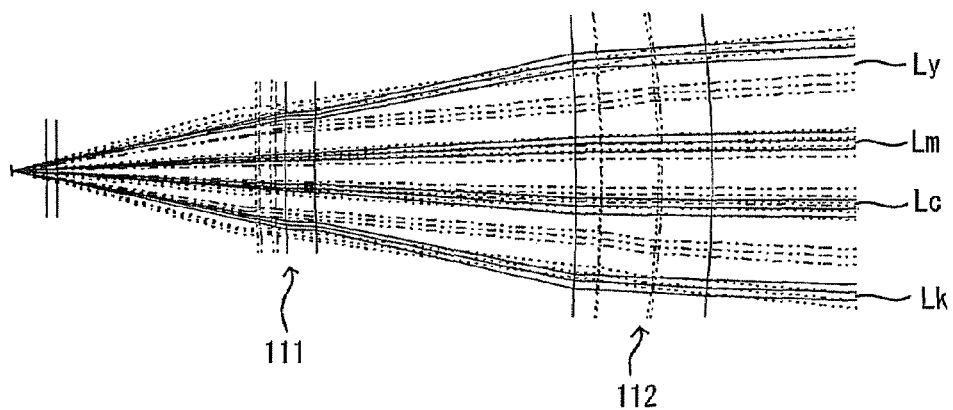
FIG. 5 is an enlarged view of the vicinity of a common (commonly-used) fθ lens in FIG. 4.

First, a first embodiment of the present invention will be described. FIG. 1 is a plan view showing a configuration of an optical system in an optical scanner according to the present embodiment in a state where turning back of a turning back mirror is extended. FIG. 2 is a cross-sectional view in a sub-scanning direction showing a schematic configuration of an image forming device 900 including the optical scanner according to the present embodiment. FIG. 3 is a view showing an optical path in the optical system in the optical scanner according to the present embodiment. FIG. 4 and FIG. 5 are cross-sectional views in the sub-scanning direction showing the optical path of an optical flux guided to a plurality of photoconductors in the optical scanner according to the present embodiment in a state where the turning back by the mirror is extended.

As shown in FIGS. 1 and 2, an optical scanner 1 according to the present embodiment includes a pre-deflection optical system (pre-deflection light guiding unit) 7, a polygon mirror (rotational deflector, light flux deflecting unit) 80, and a post-deflection optical system (post-deflection light guiding unit) A.

The optical scanner 1 has a role of scanning the light flux from a light source to a photosensitive surface of each of a plurality of photoconductors 401y to 401k in a main-scanning direction. An electrostatic latent image is formed on each of the photosensitive surfaces of the photoconductors 401y to 401k by the light flux scanned by the optical scanner 1. The electrostatic latent image formed on each of the photoconductors is developed by a developer of a color corresponding to each of the photoconductors by developing units 501y to 501k.

Hereinafter, a detail of the optical scanner 1 according to the present embodiment will be described.

The polygon mirror 80 reflects and deflects an incident light flux by a plurality of reflecting surfaces 80y to 80k arranged corresponding to each of the plurality of photoconductors 401y to 401k in a rotational direction, thereby scanning the incident light flux in the main-scanning direction. In addition, an inclination angle of each of the plurality of reflecting surfaces 80y to 80k of the polygon mirror 80 with respect to a rotational axis of the polygon mirror 80 is set to an angle depending on the photoconductor to which each of the reflecting surfaces corresponds. In a configuration such as above, the number of the reflecting surfaces of the polygon mirror 80 is a multiple of the number of colors. Here, in order to use four colors, yellow (401y), magenta (401m), cyan (401c), and black (401k), the number of the reflecting surfaces of the polygon mirror 80 is a multiple of four (4, 8, 12, . . . ).

The pre-deflection optical system 7 includes a light source 71 including an LD array having four light sources arranged in positions different from one another in the sub-scanning direction (a direction along the rotational axis of the polygon mirror) crossing the main-scanning direction at right angle, each of the four light sources capable of blinking independently, a finite lens (or a collimator lens) 72 that converts divergent light from the light source 71 into convergent light, parallel light, or reduced divergent light, an aperture 73, and a cylinder lens 74 that converges the light flux in the vicinity of the polygon mirror 80.

The pre-deflection optical system 7 has a configuration as described above, and thereby shapes light from the light source 71 into the light flux, for example, with a predetermined cross-sectional shape having a longer diameter in the main-scanning direction, to guide the light flux toward the polygon mirror 80, and also focuses the light flux in the sub-scanning direction in the vicinity of the reflecting surfaces of the polygon mirror 80.

The post-deflection optical system A includes an fθ1 lens 111 and an fθ2 lens 112 made of a resin material such as plastic and having a free-form surface of a power distribution in which power changes continuously, cylinder lenses 120y to 120k (a plurality of optical elements) provided on an optical path between a common (commonly-used) optical element and each of the photoconductors corresponding to each of the photoconductors 401y to 401k and having a positive power with a convex surface on an incident surface side, and a cover glass 130 used for preventing dirt and dust from entering into the optical scanner.

By a configuration as described above, the post-deflection optical system A guides light fluxes Ly to Lk reflected and deflected by each of the plurality of reflecting surfaces 80y to 80k of the polygon mirror 80 to the photosensitive surfaces of the photoconductors 401y to 401k corresponding to each of the reflecting surfaces in the optical path different from one another. In the present embodiment, there are eight reflecting surfaces on the polygon mirror 80. Therefore, when there is one light flux incident on the polygon mirror, one revolution of the polygon mirror 80 can write color information of four colors on each of the photoconductors twice. Here, the light source 71 adopts a so-called "multi-beam optical system" that exits four light fluxes, each of which independently forms an electrostatic latent image on the photosensitive surface. Therefore, one revolution of the polygon mirror 80 can write eight lines (four lines×2) of color information of four colors on each of the photoconductors once.

In addition, the light sources integrated in one array are also used for image forming processing of primary colors (black, cyan, magenta, and yellow) corresponding to each of the photoconductors, and thereby the number of optical parts can be reduced to attempt cost reduction and also reduction in allocation space can be achieved. In a case only one light source is allocated to be used for all the photoconductors, in order to form a latent image of four colors, the number of revolutions of the polygon mirror and a driving frequency of an LD need to be four times as many as the case where one light source is provided for each of the photoconductors. For this reason, the image forming processing in high speed and for obtaining an image with high definition has been difficult to achieve. In the present embodiment, the multi-beam optical system is adopted, and thereby a speed of forming an electrostatic latent image on a photoconductive drum can be made higher without excessively increasing the number of revolutions of the polygon mirror and the driving frequency of the LD. In addition, as compared with a case where a plurality of the light sources such as the LDs are allocated at each of different positions, the present embodiment can avoid generation of an alignment error of an allocation position of the light source and can contribute to improvement of an optical characteristic.

The fθ1 lens 111 and the fθ2 lens 112 have a curvature independently changing in two directions, the main-scanning direction and the sub-scanning direction. Here, the fθ1 lens 111 and the fθ2 lens 112 correspond to the common (commonly-used) optical element. The power distribution of each of the fθ1 lens 111 and the fθ2 lens 112 is set to the power distribution that applies power to all the light fluxes (all the light fluxes reflected and deflected by each of the plurality of reflecting surfaces) Ly to Lk which are reflected and deflected by the polygon mirror 80 and needed to be guided to each of the plurality of photoconductors 401y to 401k, so that the light fluxes guided to the photosensitive surface by the post-deflection optical system A depending on the incident position of the light fluxes has the predetermined optical characteristic (for example, a characteristic that meets a predetermined condition with respect to a beam diameter of the light flux, a degree of curvature of a scan line, a position of the light flux on a scanning region, and so on) on the photosensitive surface, with the fθ1 lens 111 and the fθ2 lens 112 working in association with an optical element 120 acting on the light beam guided to each of the individual photoconductors. As described above, the common (commonly-used) optical element has a smooth lens surface that acts on all the light fluxes reflected and deflected by each of the plurality of reflecting surfaces on the polygon mirror 80.

As described above, a part of an optical element which has been independently provided on each of the conventional photoconductors is integrated in the common (commonly-used) optical element, and power is applied to all the light fluxes that need to be guided to the plurality of photoconductors by the common (commonly-used) optical element. Thereby, the present embodiment can contribute to the reduction in the allocating space of the optical parts in the sub-scanning direction. In addition, since the number of items of the optical parts to be allocated can be reduced, the present embodiment can avoid deterioration of the optical characteristic resulting from the alignment error of each of the optical parts and so on, and contribute to achieving lower cost.

In addition, by integrating a part of the optical element provided independently on each of the photoconductors in the common (commonly-used) optical element, an inclination angle of each of the reflecting surfaces of the polygon mirror can be set to a small angle, and the allocation space in the sub-scanning direction of the optical system can be made small. In addition, generation of an asymmetrical wave aberration which becomes large when the inclination angle of the reflecting surfaces of the polygon mirror is large can be restricted, and improvement of an image forming characteristic can be achieved. Further, by applying the optical scanner of a configuration as described above to the image forming device, the present embodiment can contribute to downsizing of the image forming device and stabilization of image quality in the image forming processing.

Here, the "predetermined optical characteristic" means an optical characteristic desirable for forming the electrostatic latent image on the photosensitive surface of the photoconductor. In addition, by providing a configuration in which the incident light flux on the polygon mirror from the pre-deflection optical system is focused in the vicinity of the reflecting surfaces (the incident light flux is made to have a conjugated relationship on the reflecting surfaces of the polygon mirror and on the photosensitive surface of the photoconductor in the sub-scanning direction), shifting of a beam position in the sub-scanning direction resulting from an inclination of each of the reflecting surfaces of the polygon mirror is restricted (surface tilt correction).

In addition, power is set to be distributed to the fθ1 lens 111 and the fθ2 lens 112 (common (commonly-used) optical element) in the present embodiment in a manner that a composite focal point position in the sub-scanning direction on the polygon mirror side is positioned nearer to a side a rotational axis of the polygon mirror 80 is allocated rather than the reflecting surfaces 80y to 80k of the polygon mirror 80 in an optical axis direction of the fθ1 lens 111 and the fθ2 lens 112. FIG. 4 shows a focal plane FS including the composite focal point position in the sub-scanning direction on the polygon mirror side of the fθ1 lens 111 and the fθ2 lens 112. In FIGS. 4 and 5, a dotted line shows a light beam on an incident side of the light flux from the pre-deflection optical system (when a scanning angle has a minimum value) and a lens cross section acting on the light beam, a bold line shows the light beam when a scanning angle position of scanning light is at a center position in the main-scanning direction and a lens cross section acting on the light beam, and a two-dot chain line shows the light beam on a side not approaching to the pre-deflection optical system in the scanning region (when the scanning angle has a maximum value) and the lens cross section acting on the light beam. FIG. 5 enlarges and displays the vicinity of the fθ1 lens 111 and the fθ2 lens 112.

Figure 6:
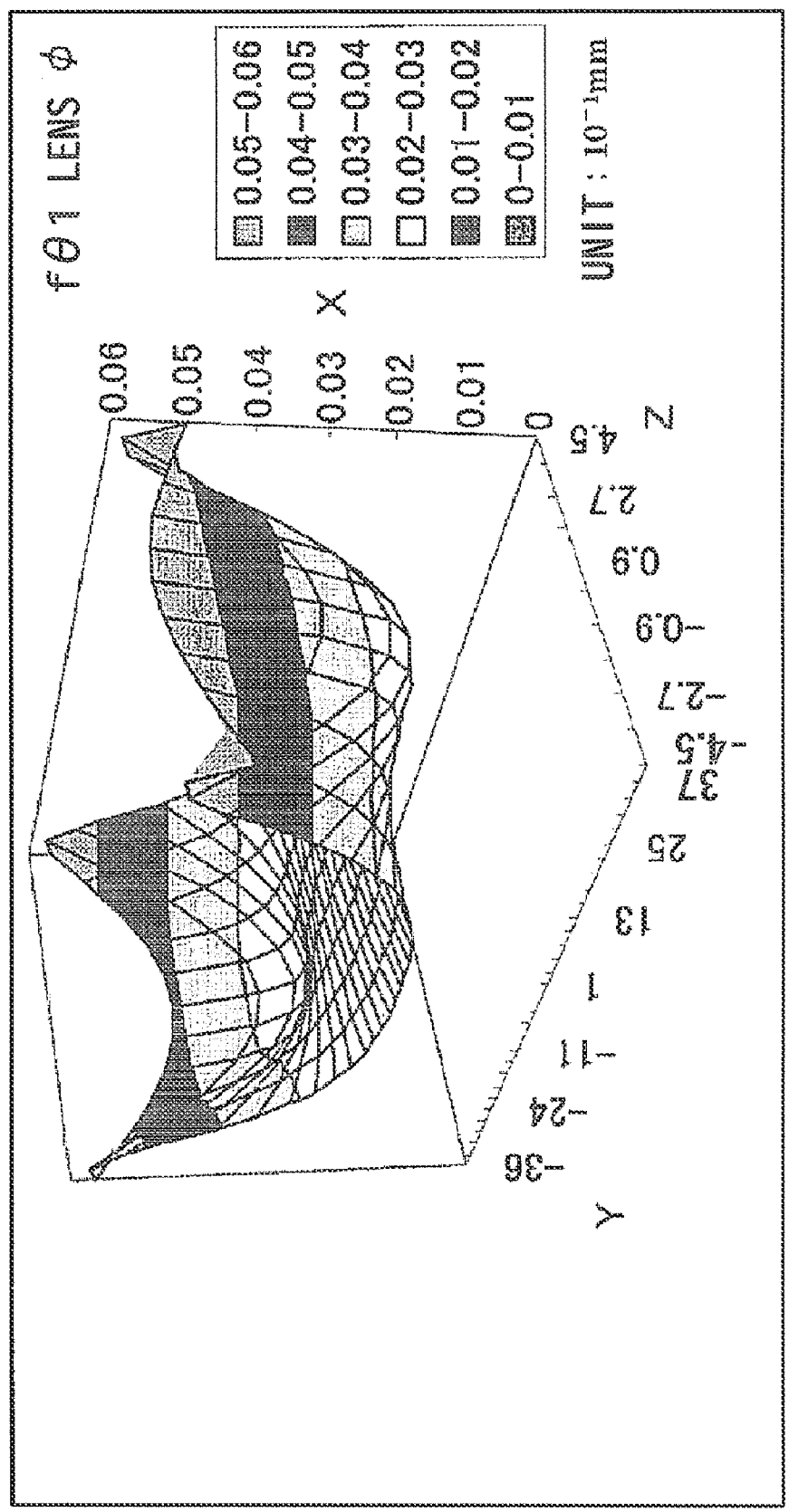
FIG. 6 is a view showing an example of a power distribution of an fθ1 lens 111 in the sub-scanning direction.
Figure 7:
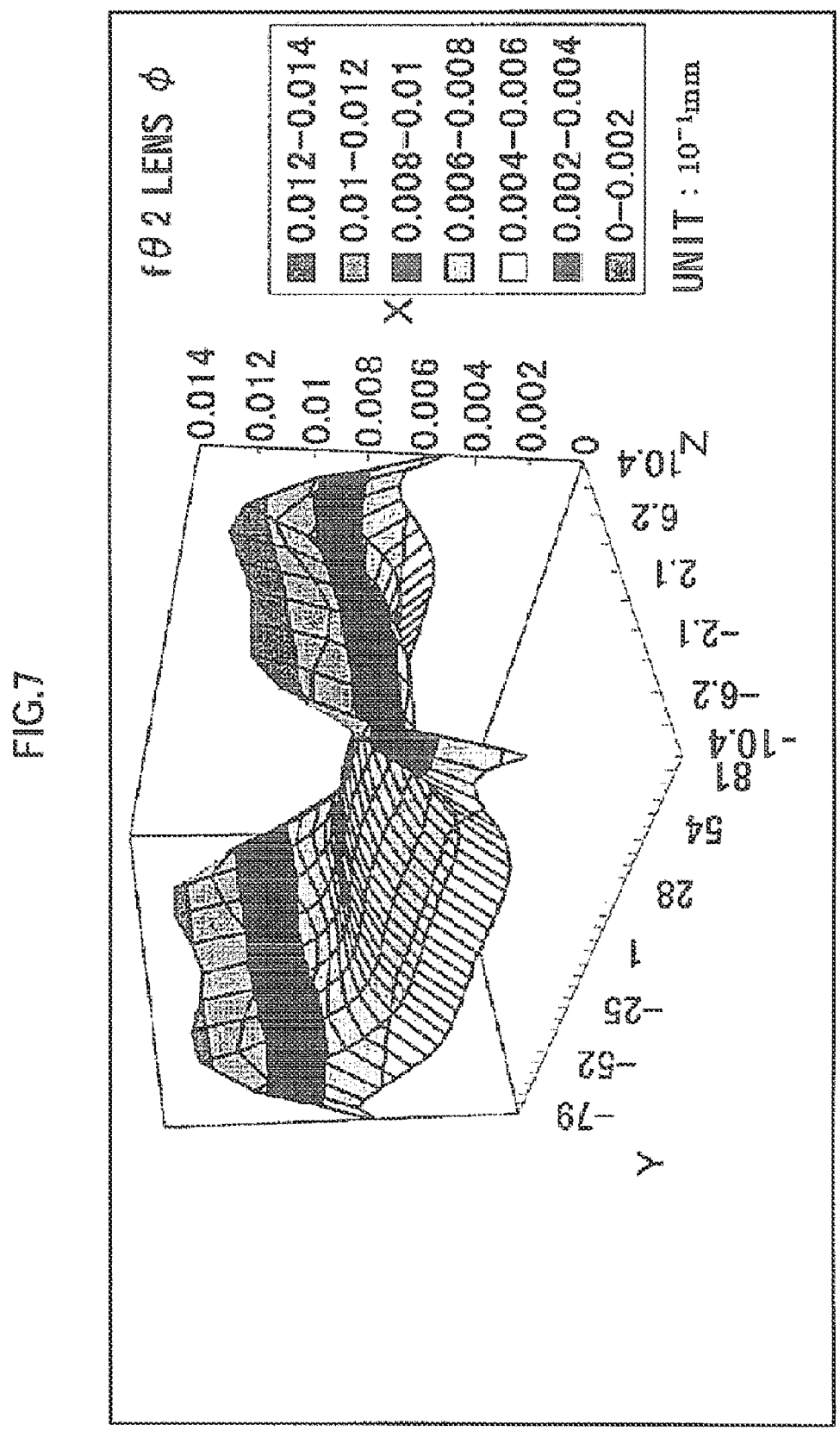
FIG. 7 is a view showing an example of a power distribution of an fθ2 lens 112 in the sub-scanning direction.

A result of optimization indicated that, when the inclination angle of the reflecting surfaces of the polygon mirror in the sub-scanning direction becomes large, the image forming characteristic tends to be deteriorated. For this reason, in order to obtain a sufficient distance in the sub-scanning direction for separating the optical path by an optical path separating mirror even with a small inclination angle, a focal point position as described above is set, so that each of the light fluxes separates from one another in the sub-scanning direction (so that the light flux which has passed the common (commonly-used) optical element advances while space between principal rays widens) even on a downstream side of the optical path after passing through the fθ1 lens 111 and the fθ2 lens 112. By setting the composite focal point position of the fθ1 lens 111 and the fθ2 lens 112 in the sub-scanning direction on the polygon mirror side at the focal plane position as described above, space in which the turning back mirror and so on for separating each of the light beams are allocated can be secured. FIG. 6 is a view showing an example of the power distribution of the fθ1 lens 111 in the sub-scanning direction. FIG. 7 is a view showing an example of the power distribution of the fθ2 lens 112 in the sub-scanning direction.

As shown in FIG. 4, each of the optical axis of the cylinder lenses 120y to 120k is allocated so as to be eccentric to the optical axis side of a common (commonly-used) optical element 110 more than each of the light beams with respect to the sub-scanning direction, and has a predetermined inclination. The result of the optimization has indicated that the curvature of the scan line on an image surface can be made sufficiently small by providing allocation as described above.

In addition, the pre-deflection optical system 7 shapes light from the light source 71 into the light flux having a cross-sectional shape with a longer diameter in the main-scanning direction and guides the light flux toward the polygon mirror 80, and also crosses the light fluxes from the plurality of light sources at a position nearer to an upstream side in an advancing direction of the light fluxes than to the reflecting surfaces 80y to 80k of the polygon mirror 80 in the sub-scanning direction.

Figure 8:
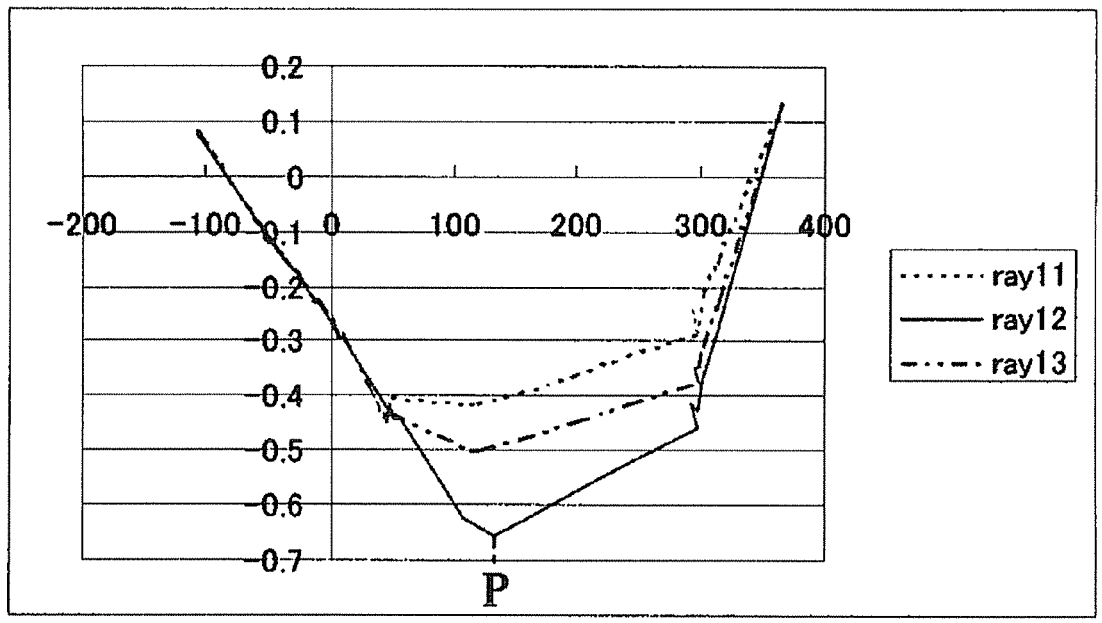
FIG. 8 is a view showing a relationship between space between principal rays of light fluxes of light sources positioned on both ends among a plurality of light sources in the sub-scanning direction, and a position in an optical axis direction.
Figure 9:
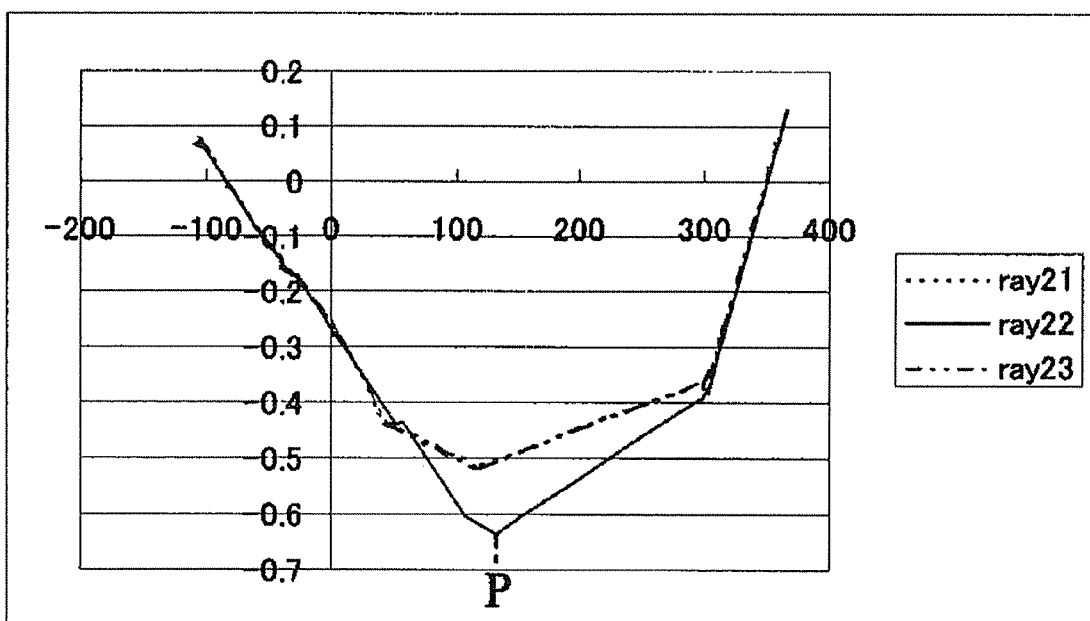
FIG. 9 is a view showing a relationship between the space of the principal rays of the light fluxes from the light sources positioned on both ends among the plurality of light sources in the sub-scanning direction, and the position in the optical axis direction.
Figure 10:
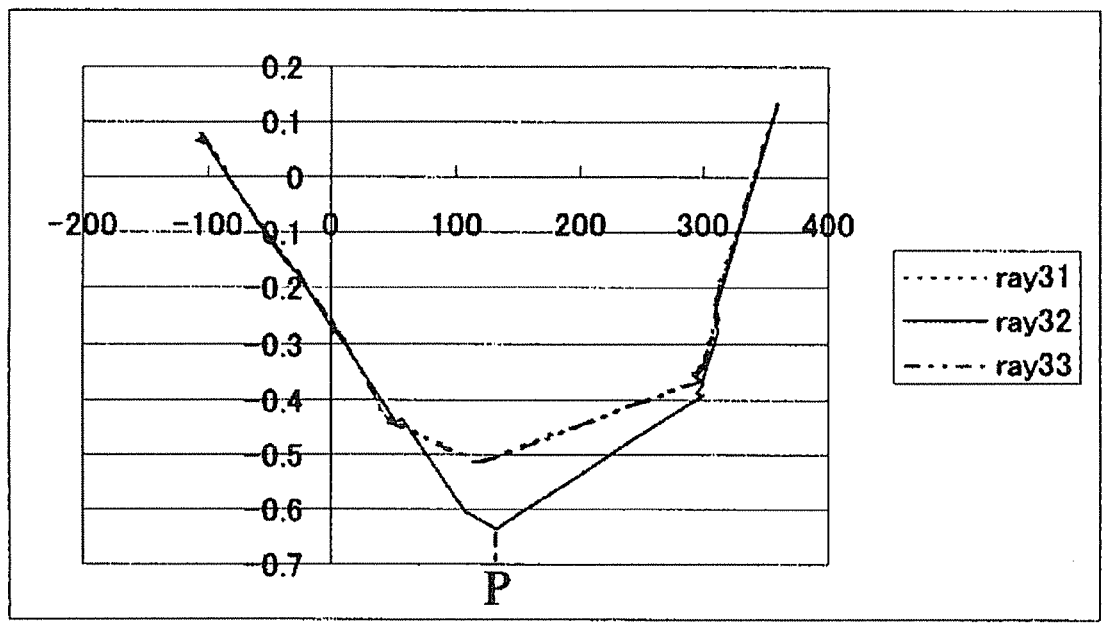
FIG. 10 is a view showing a relationship between the space of the principal rays of the light fluxes from the light sources positioned on both ends among the plurality of light sources in the sub-scanning direction, and the position in the optical axis direction.
Figure 11:
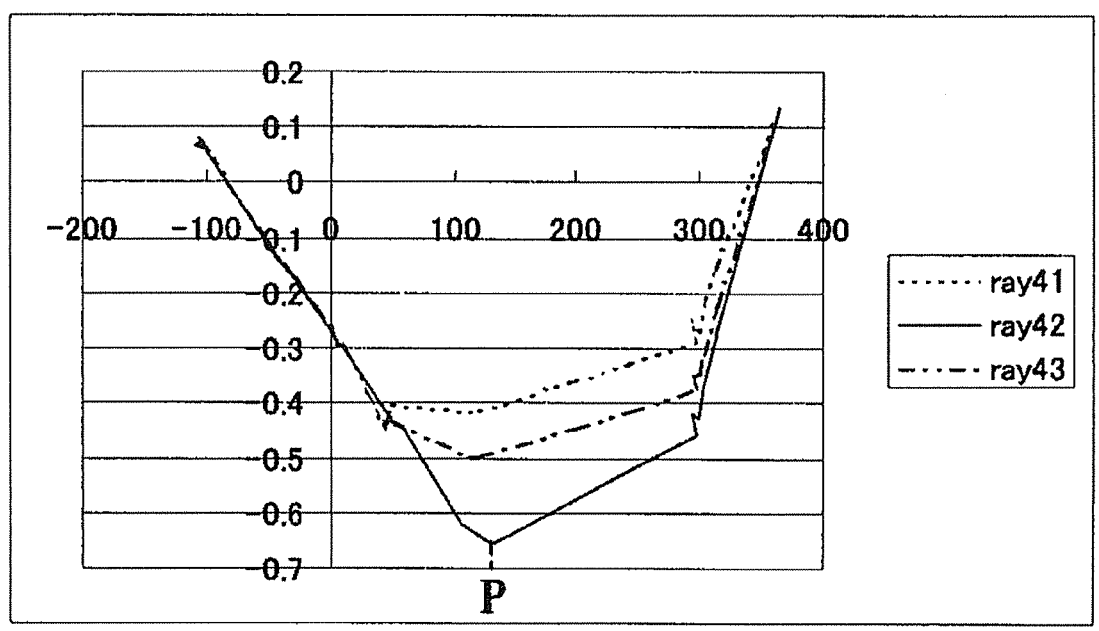
FIG. 11 is a view showing a relationship between the space of the principal rays of the light fluxes from the light sources positioned on both ends among the plurality of light sources in the sub-scanning direction, and the position in the optical axis direction.

FIGS. 8 to 11 show a relationship between space between the principal rays (hereinafter referred to as the distance between the principal rays) (vertical axis) of the light flux from the light sources (here, a first light source and a fourth light source) positioned on both ends in the sub-scanning direction among the plurality of light sources, and the positions in the optical axis direction (horizontal axis). In FIGS. 8 to 11, a position P shows an exit surface position of the fθ2 lens 112, and "0" in the horizontal axis shows a position of the reflecting surfaces of the polygon mirror 80. Here, FIG. 8 shows a light flux Ly deflected to a top position in FIG. 4, FIG. 9 shows a light flux Lm deflected to a second position from the top position in FIG. 4, FIG. 10 shows a light flux Lc deflected to a third position from the top position in FIG. 4, and FIG. 11 shows a light flux Lk deflected to a bottom position in FIG. 4.

As shown in FIGS. 8 to 11, according to the configuration where the light fluxes from the plurality of light sources are crossed at a position nearer to the upstream side in the advancing direction of the light flux than to the reflecting surfaces 80y to 80k in the sub-scanning direction, the distance between the principal rays after passing through the fθ1 lens 111 and the fθ2 lens 112 gradually changes to be narrower, and a rate of the change of the distance between the principal rays with respect to the optical axis direction between the cylinder lens and the image surface can be reduced. The distance between the principal rays after passing through the fθ lenses is reduced to be small on the cylinder lens in the relationships shown in FIGS. 8 to 11, thereby the light flux on the photosensitive surface can be made to have the optical characteristic appropriate for the image forming, and a fluctuation of a beam pitch on the photosensitive surface can be restricted even in a case where the position of the photosensitive surface fluctuates in the optical axis direction along with the rotation of the photoconductor drum due to a shape error of the photoconductor drum, the shift (such as inclination and decentering) of a rotational axis, abrasion, and so on.

After the light fluxes passed through the fθ1 lens 111 and the fθ2 lens 112, space between a plurality of the beams is made to be closer to a desired pitch between beams as the light fluxes advance to the downstream of the optical path so as not to increase a change amount of the pitch between beams with respect to the optical axis direction after passing the last cylinder lens to form an image. This is effective for controlling by providing a tilt mechanism on the turning back mirror, and for restricting generation of shifting of the pitch between beams when a change of a length of the optical path generated by an influence of a variation of a diameter of the photoconductor drum occurs, in order to correct tilting of the scan line on the photoconductor or tilting of a transfer image due to tilting of the photoconductor drum in a case of a color machine.

Power of the fθ1 lens 111 and the fθ2 lens 112 (common (commonly-used) optical elements) in the sub-scanning direction in a range between at least the optical axis positions and a position where the principal ray of the light fluxes from the plurality of light sources passes (a range in the vicinity of a center in the sub-scanning direction) is set to be higher at positions nearer to an outer side than at the center position in the main-scanning direction (refer to FIGS. 6 and 7).

An effective focal length on the cylinder lens 120 positioned nearer to the downstream side than the fθ2 lens 112 in the advancing direction of the light flux becomes shorter as an incident angle of the light flux in the main-scanning direction becomes larger. Therefore, in order that the pitch between beams on the image surface of a beam group forming one latent image is kept to be constant, an angle change amount is made to be small (position shifting in the sub-scanning direction of the light flux incident on the incident surface of the cylindrical lens is reduced) by increasing the power in the sub-scanning direction on the fθ lens when the incident angle in the main-scanning direction is large (the scanning angle is large), and by lowering a maximum height with respect to the optical axis at the cylinder lens 120 as much as possible. In this manner, the constant pitch between beams is finally kept on the image surface.

In addition, the power of the fθ1 lens 111 and the fθ2 lens 112 in the sub-scanning direction in the range between at least the optical axis position and the position where the principal ray of the light fluxes from the plurality of light sources passes (the range in the vicinity of the center in the sub-scanning direction) is set to be lower at positions nearer to the outer side than at the center position in the sub-scanning direction (refer to FIGS. 6 and 7).

The light flux passing through the common (commonly-used) optical element has the optical path length which is different depending on at which position in the sub-scanning direction the common (commonly-used) optical element passes. According to the present embodiment, a beam diameter (light focus position) when the light fluxes having a passing position in the sub-scanning direction different from one another reach an optical element positioned on the downstream side of the optical path can be made to be substantially the same, and the variation of the optical characteristic depending on the passing position in the sub-scanning direction can be restricted. As obvious from FIG. 4, a light beam at outer side has larger inclination in the sub-scanning direction and longer actual optical path length.

Figure 42:
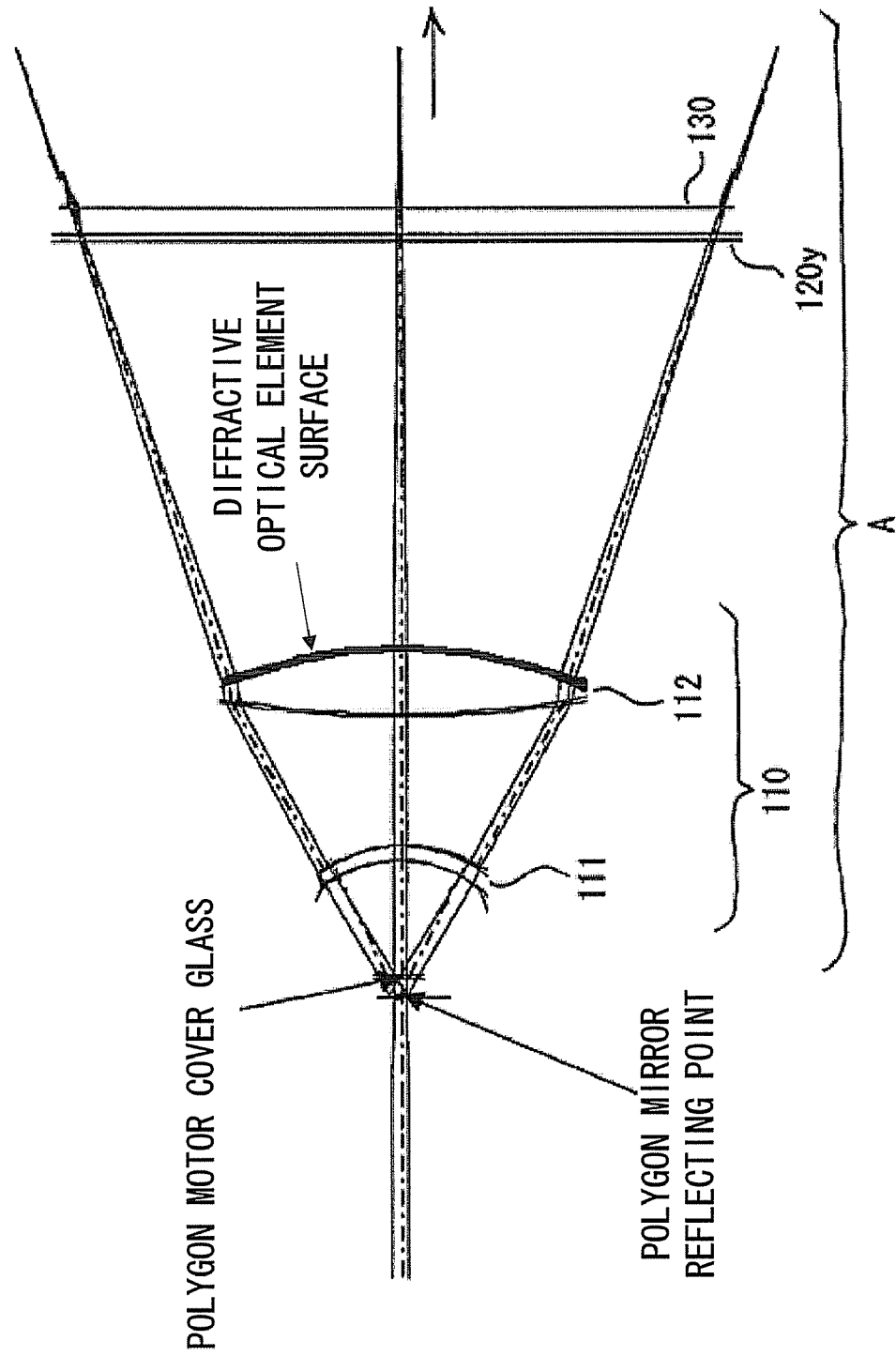
FIG. 42 is a view showing an example in which a diffractive optical element surface (indicated by a bold line) is formed on an exit surface side of the fθ2 lens 112 in the configuration shown in FIG. 3.
Figure 43:
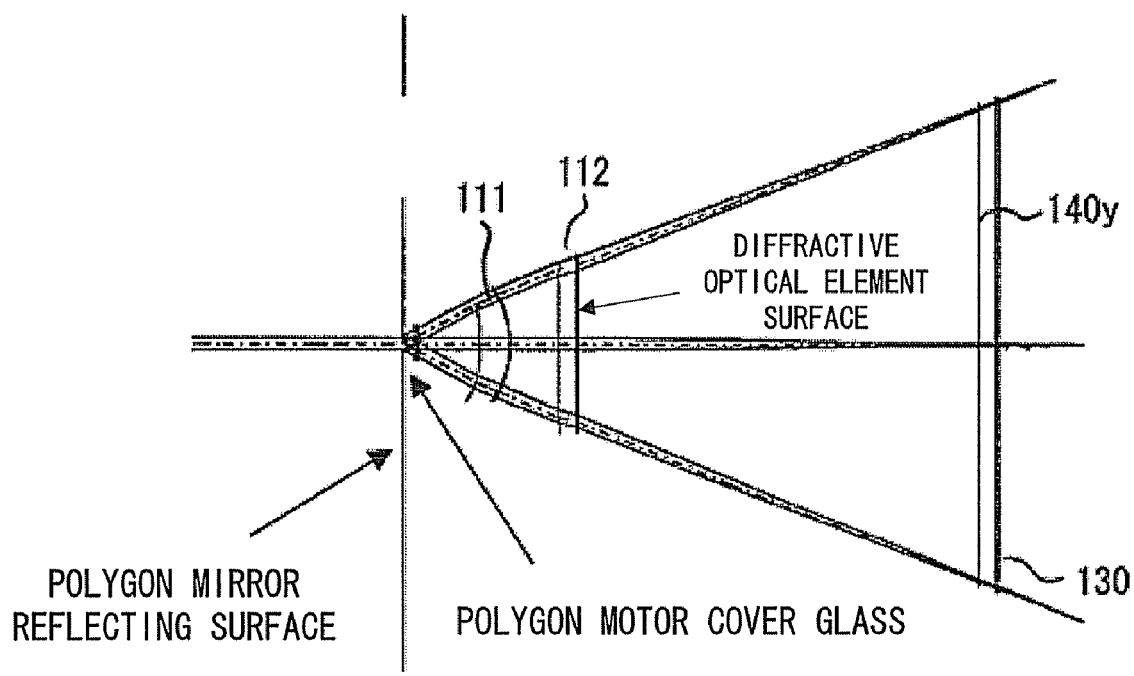
FIG. 43 is a view showing an example in which the diffractive optical element surface (indicated by a bold line) is formed on an exit surface side of the fθ2 lens 112 in the configuration shown in FIG. 32.

Although a combination of only refractive lenses is provided in the present embodiment, a diffractive optical element surface is further desirably added to a refractive lens surface in a manner to restrict a magnification chromatic aberration in the main-scanning direction in order to restrict a variation of a scan line length due to a wavelength variation of a plurality of beams. FIG. 42 is a view showing an example in which the diffractive optical element surface (indicated by a bold line) is formed on the exit surface side of the fθ2 lens 112 in the configuration shown in FIG. 3. FIG. 43 is a view showing an example in which the diffractive optical element surface (indicated by a bold line) is formed on the exit surface side of the fθ2 lens 112 in the configuration shown in FIG. 32.

Figure 12:
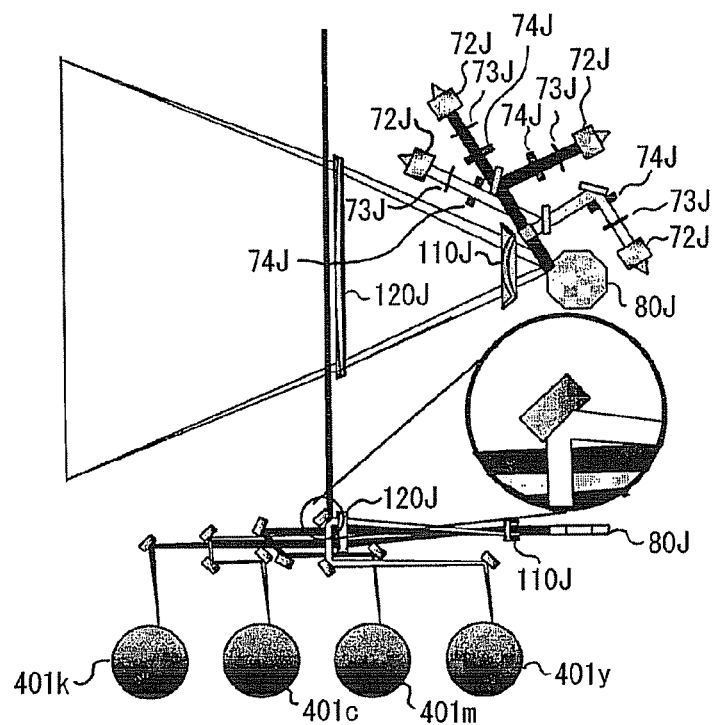
FIG. 12 is a view showing an example of allocation of an optical system of a conventional optical scanner included in a color image forming device.

FIG. 12 is a view showing an example of allocation of the optical system of the conventional optical scanner included in a color image forming device. As compared with the conventional optical scanner in which finite lenses 72J, apertures 73J, and cylinder lenses 74J configuring the pre-deflection optical system are allocated as many as the number of the photoconductor drums shown in FIG. 12, the configuration of the optical scanner according to the present embodiment shown in FIG. 1 is understood to be obviously contributing to space saving and lowering of cost.

In the present embodiment, there has been shown an example where the common (commonly-used) optical element includes two of the fθ lenses. However, the present invention is not limited thereto, and may include three or more of the lenses. In this manner, the common (commonly-used) optical element is configured with a plurality of the lenses, thereby a curvature of the lens surface of each of the lenses can be set to be gentle, processing is facilitated, and the present invention can contribute to lowering of manufacturing cost and improvement of processing precision, as compared with a case where the common (commonly-used) optical element is configured with one lens.

In the present embodiment, the power distribution is set to be continuously changing on both the incident surface and the exit surface of each of the fθ1 lens and the fθ2 lens constituting the common (commonly-used) optical element. However, the power distribution does not need to be set as described above on all the lens surfaces of the common (commonly-used) optical element. In general, when the common (commonly-used) optical element is constituted by a plurality of the lenses as described above, the lens positioned on the downstream side in the light flux advancing direction has larger size in many cases. That is, the light flux incident on the lens on the downstream side in the advancing direction of the light flux has a smaller diameter of beam and a moving distance of the light flux is longer as compared with the lens positioned on the upstream side in the same scanning angle. Therefore, it is considered that a larger effect is obtained by the power distribution continuously changing as described above. For this reason, when the common (commonly-used) optical element as described above is constituted by the plurality of lenses, the power that changes continuously as described above is desirably applied on the exit surface side of the lens positioned on the most downstream side in the advancing direction of the light flux (that is, on a side closest to the image surface).

Second Embodiment

Next, a second embodiment of the present invention will be described. The present embodiment is a modification example of the first embodiment described above, and in particular, a configuration in the vicinity of the fθ lens is different from the first embodiment. Hereinafter, a part identical to the part which has already been described in the first embodiment will be attached with the same numerical number, and description thereof will be omitted.

Figure 13:
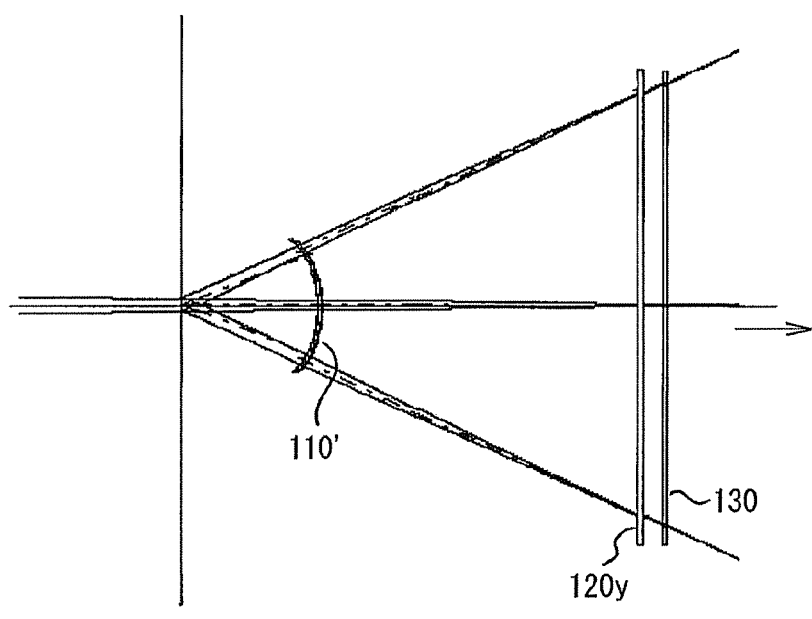
FIG. 13 is a view showing the optical path in the optical system in the optical scanner according to a second embodiment of the present invention.
Figure 14:
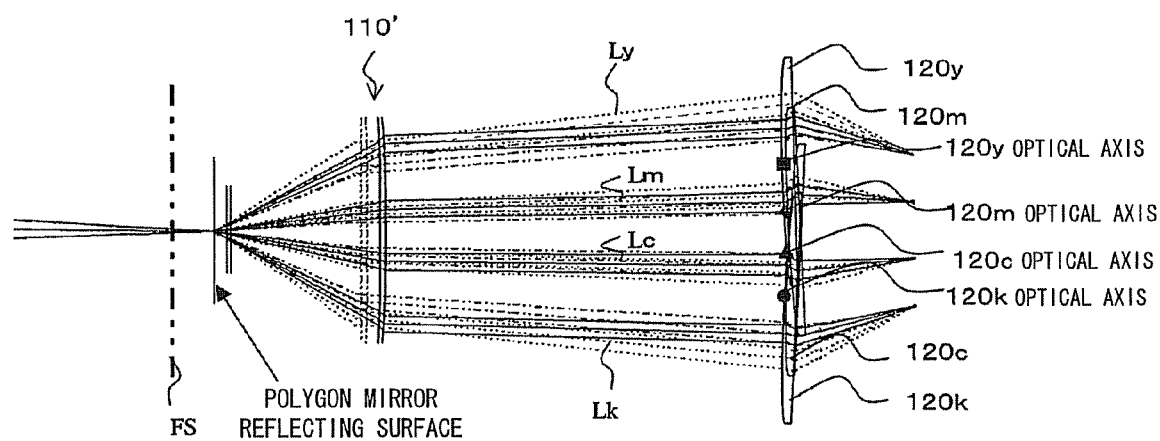
FIG. 14 is a view showing the optical path of the light flux guided to the plurality of photoconductors in the optical scanner according to the second embodiment in an enlarged manner in a sub-scanning direction in a state where turning back by the mirror is extended.
Figure 15:
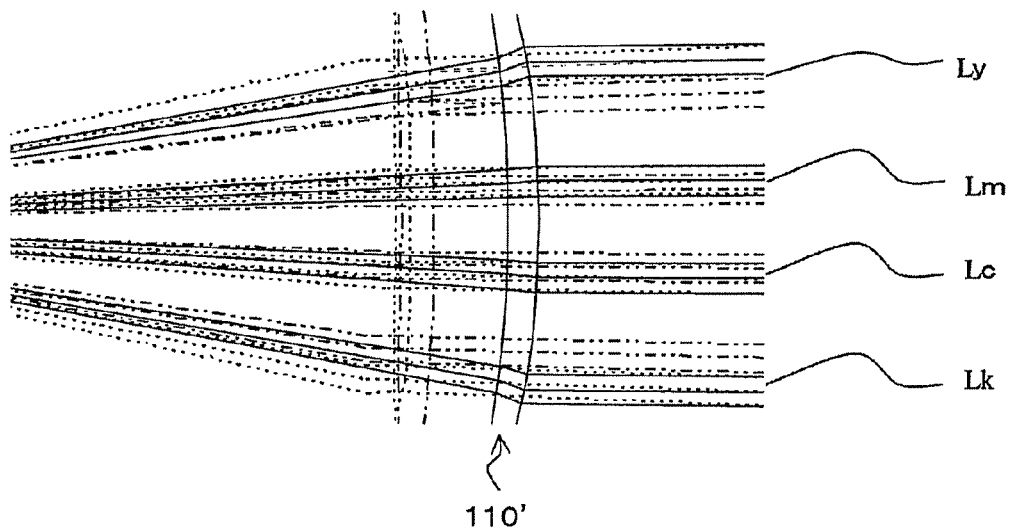
FIG. 15 is an enlarged view of the vicinity of a common (commonly-used) fθ lens in FIG. 14.

FIG. 13 is a plan view showing the optical path in the optical system in the optical scanner according to the present embodiment. FIG. 14 is a view showing the optical path of the light flux guided to a plurality of the photoconductors in the optical scanner according to the present embodiment in an enlarged manner in the sub-scanning direction in a state where turning back by the mirror is extended. FIG. 15 is an enlarged view of the vicinity of the common (commonly-used) fθ lens in FIG. 14. In FIGS. 14 and 15, a dotted line shows a light beam on an incident side of the light flux from the pre-deflection optical system (when the scanning angle has a minimum value) and a lens cross section acting on the light beam, a bold line shows the light beam when the scanning angle position of scanning light is at the center position in the main-scanning direction and a lens cross section acting on the light beam, and a two-dot chain line shows the light beam on a side not approaching to the pre-deflection optical system in the scanning region (when the scanning angle has a maximum value) and a lens cross section acting on the light beam.

In the present embodiment, the fθ1 lens 111 and the fθ2 lens 112 in the first embodiment are integrated into an fθ lens 110' (common (commonly-used) optical element). In this manner, the number of items of parts of the optical system can be reduced as compared with the configuration in the first embodiment, and the present embodiment can contribute to lowering of cost.

Figure 16:
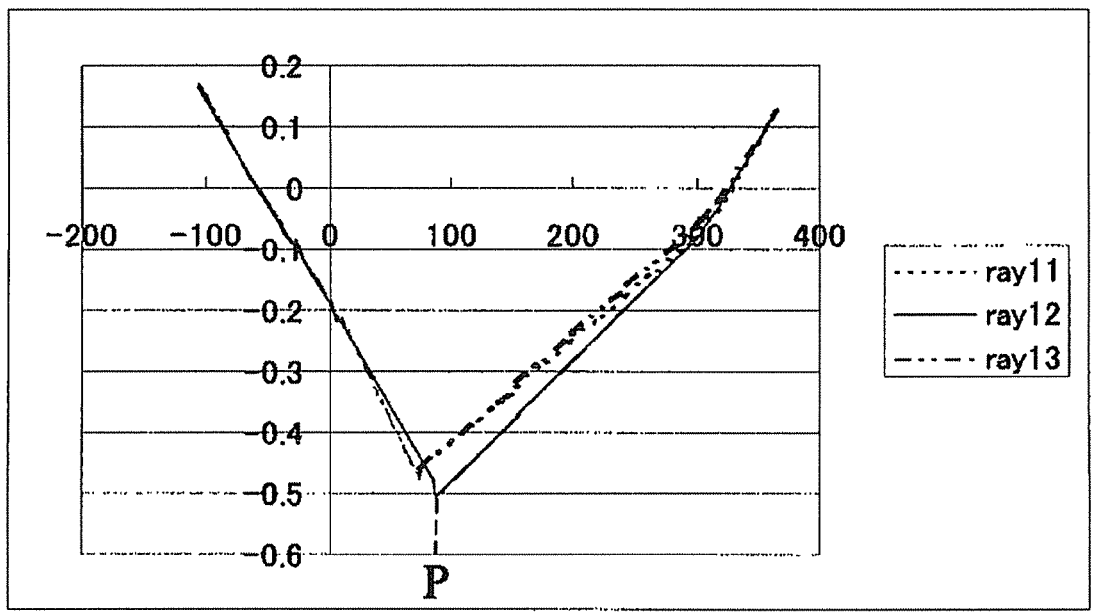
FIG. 16 is a view showing the relationship between the space of the principal rays of the light fluxes from the light sources positioned on both ends among the plurality of light sources in the sub-scanning direction, and the position in the optical axis direction according to the second embodiment.
Figure 17:
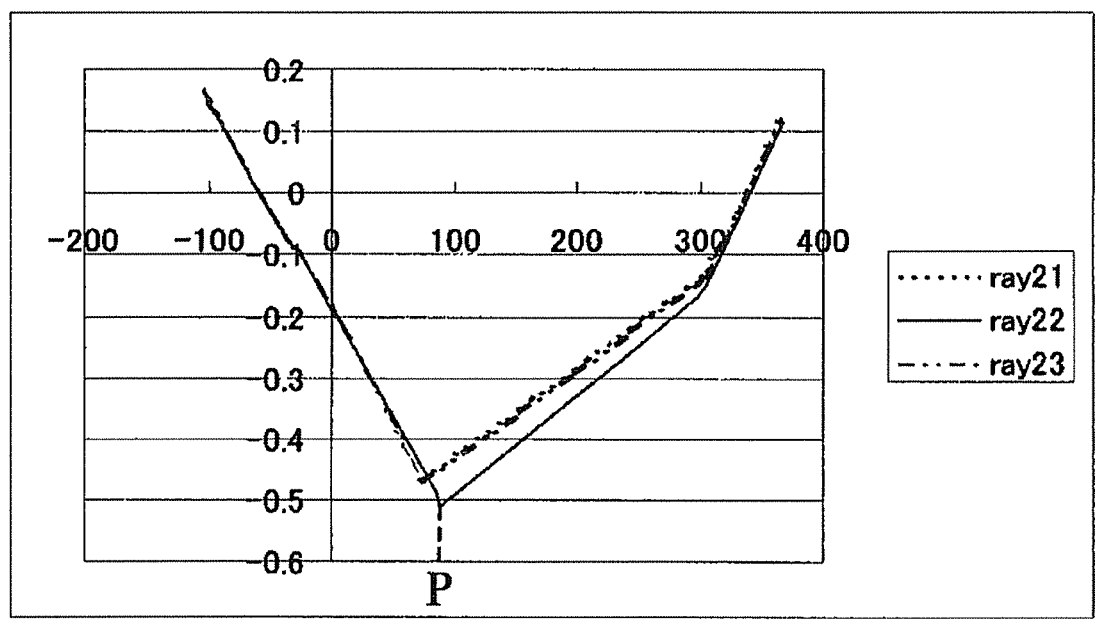
FIG. 17 is a view showing the relationship between the space of the principal rays of the light fluxes from the light sources positioned on both ends among the plurality of light sources in the sub-scanning direction, and the position in the optical axis direction according to the second embodiment.
Figure 18:
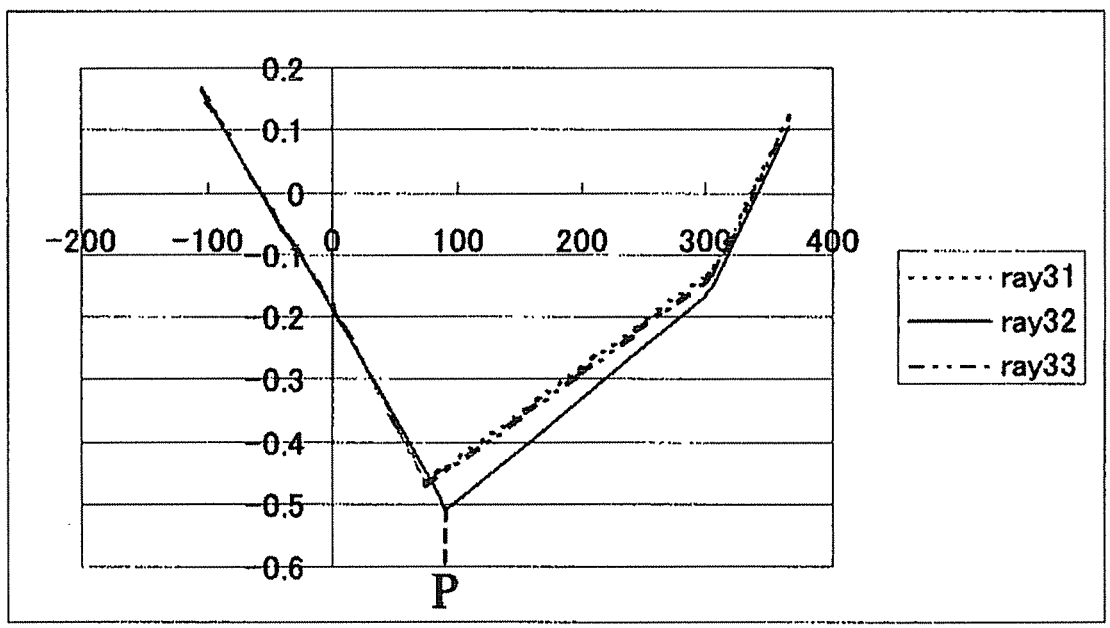
FIG. 18 is a view showing the relationship between the space of the principal rays of the light fluxes from the light sources positioned on both ends among the plurality of light sources in the sub-scanning direction, and the position in the optical axis direction according to the second embodiment.
Figure 19:
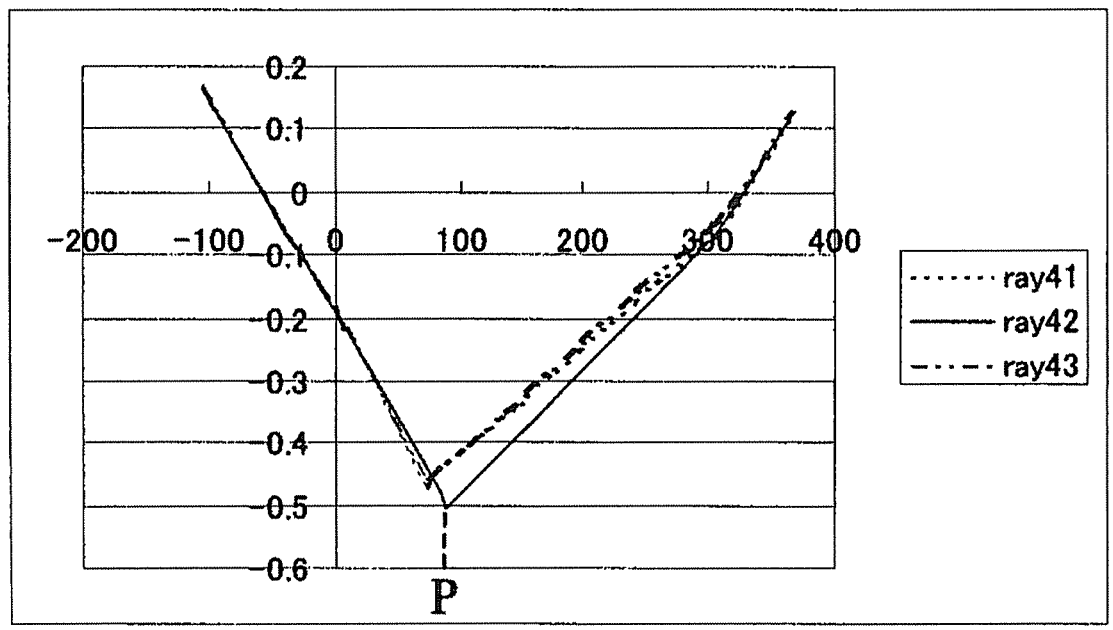
FIG. 19 is a view showing the relationship between the space of the principal rays of the light fluxes from the light sources positioned on both ends among the plurality of light sources in the sub-scanning direction, and the position in the optical axis direction according to the second embodiment.

FIGS. 16 to 19 show a relationship between space between the principal rays (hereinafter referred to as the distance between the principal rays) (vertical axis) of the light flux from the light sources (here, the first light source and the fourth light source) positioned on both ends in the sub-scanning direction among the plurality of light sources, and the positions in the optical axis direction (horizontal axis). In FIGS. 16 to 19, a position P shows the exit surface position of the fθ lens 110', and "0" in the horizontal axis shows a position of the reflecting surfaces of the polygon mirror 80. Here, FIG. 16 shows the light flux Ly deflected to a top position in FIG. 14, FIG. 17 shows the light flux Lm deflected to a second position from the top position in FIG. 14, FIG. 18 shows the light flux Lc deflected to a third position from the top position in FIG. 14, and FIG. 19 shows the light flux Lk deflected to a bottom position in FIG. 14.

Figure 20:
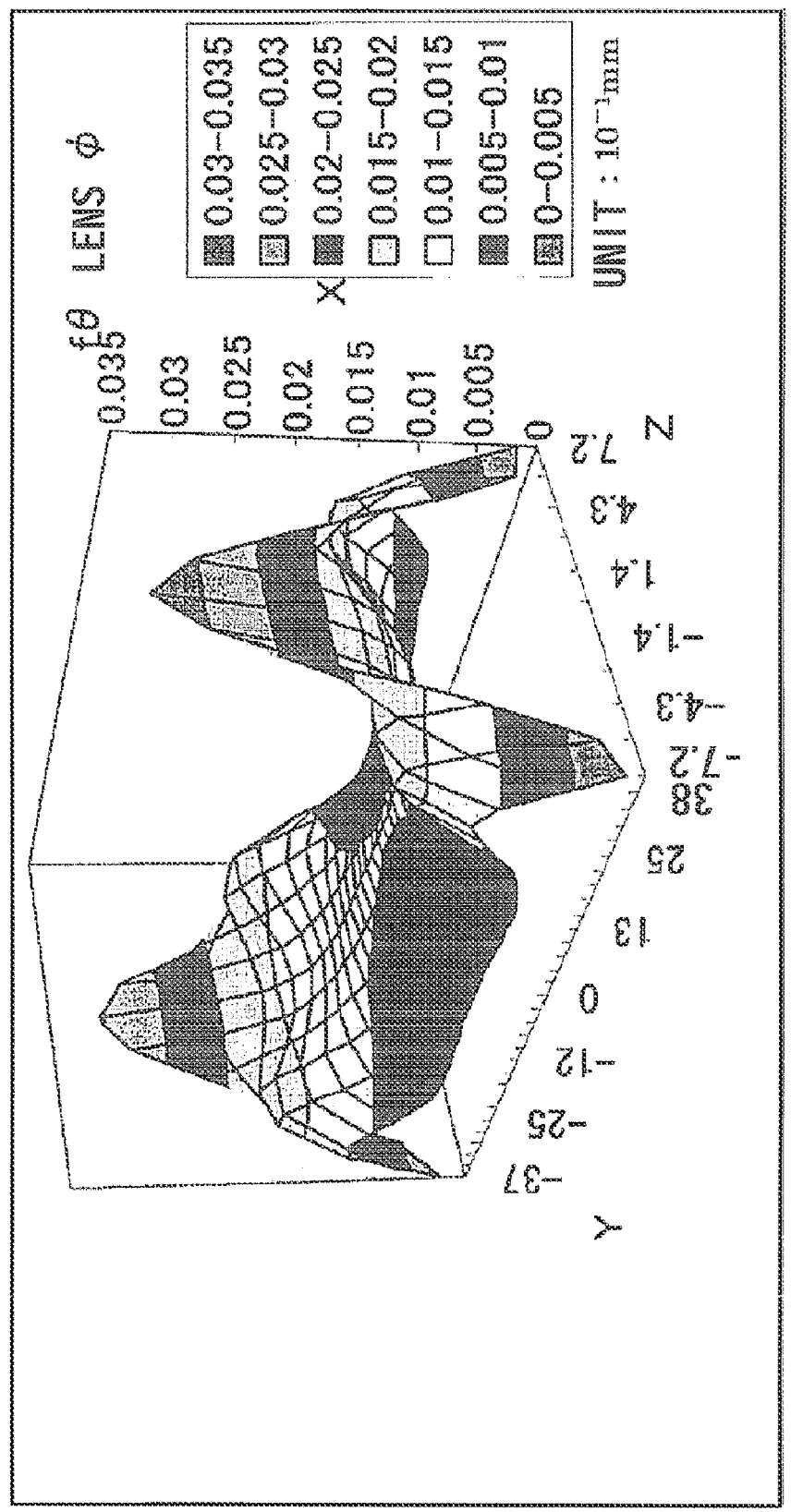
FIG. 20 is a view showing a power distribution of an fθ lens 110' in the sub-scanning direction according to the second embodiment.
Figure 21:
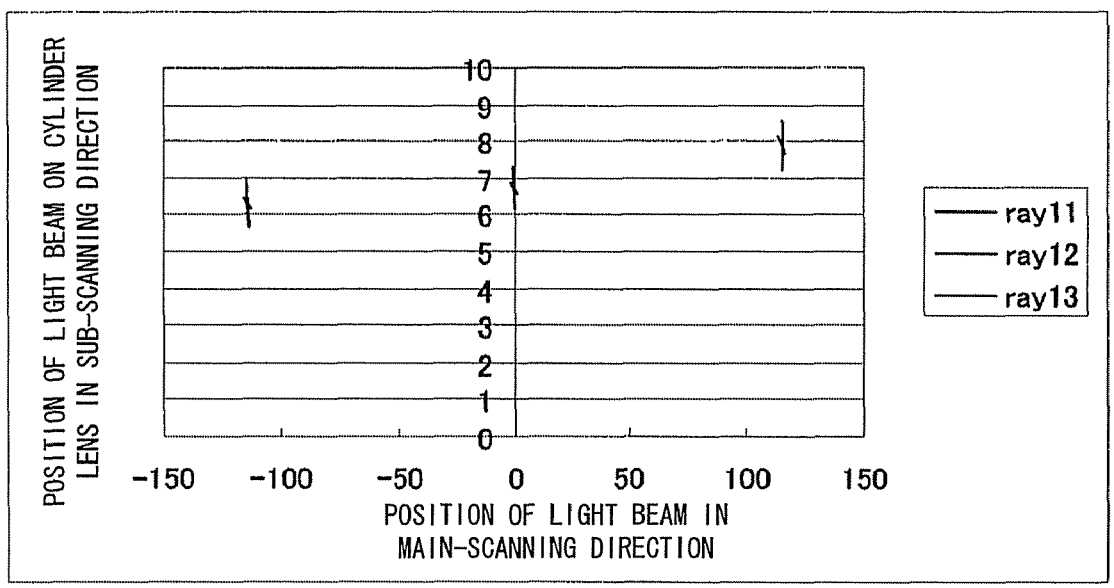
FIG. 21 is a view showing a position of a light beam incident on an incident surface of a cylinder lens 120y in the sub-scanning direction according to the second embodiment.

FIG. 20 shows the power distribution in the sub-scanning direction of the fθ lens 110' according to the present embodiment. FIG. 21 is a view showing a position of a light beam incident on the incident surface of the cylinder lens 120y in the sub-scanning direction according to the present embodiment. As shown in FIGS. 20 and 21, in a plus side in the main-scanning direction, by increasing the power in the sub-scanning direction at the fθ lens when the scanning angle of the scan light is large, a variation of the position in the sub-scanning direction of the light beam incident on the cylinder lens depending on the scanning angle of the scan light in the main-scanning direction is obviously restricted.

Figure 44:
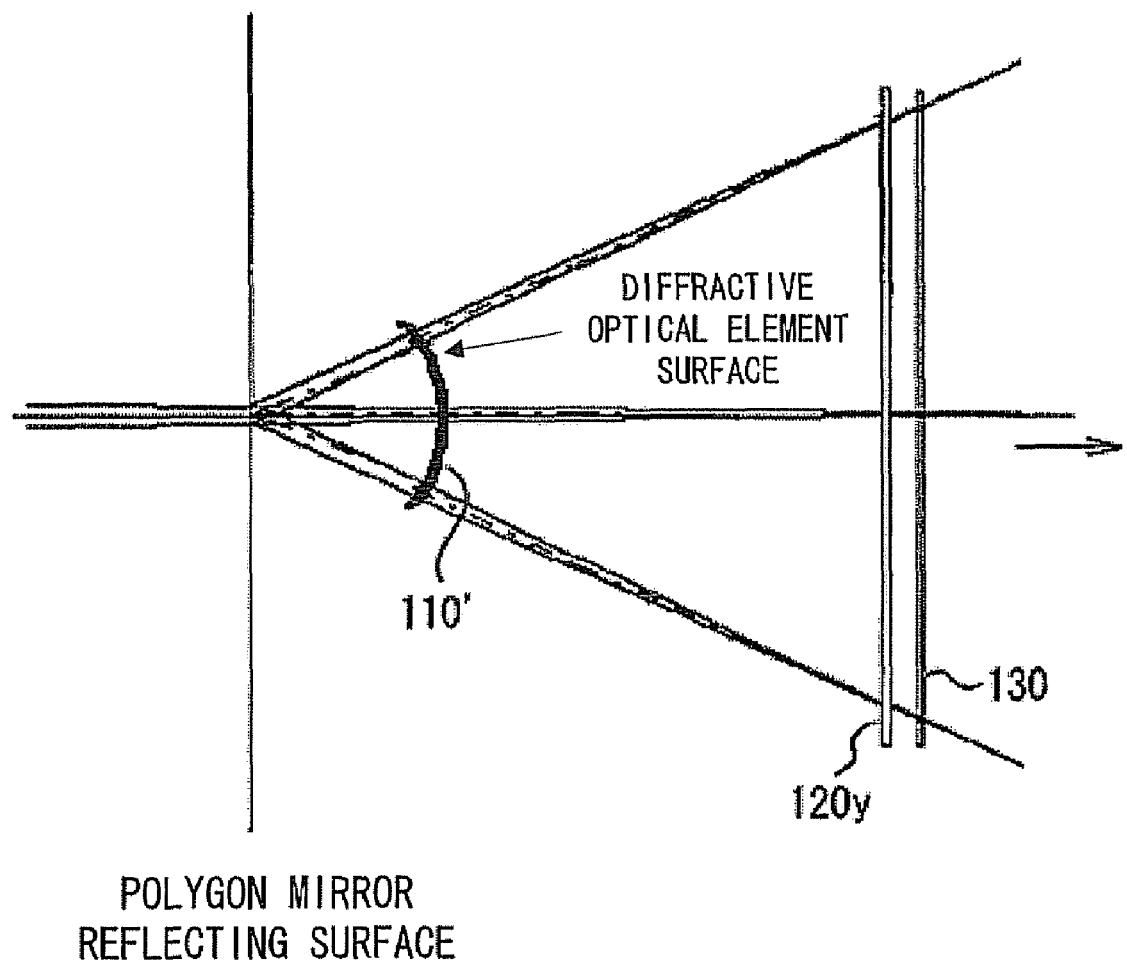
FIG. 44 is a view showing an example in which the diffractive optical element surface (indicated by a bold line) is formed on an exit surface side of the fθ lens 110' in the configuration shown in FIG. 13.
Figure 45:
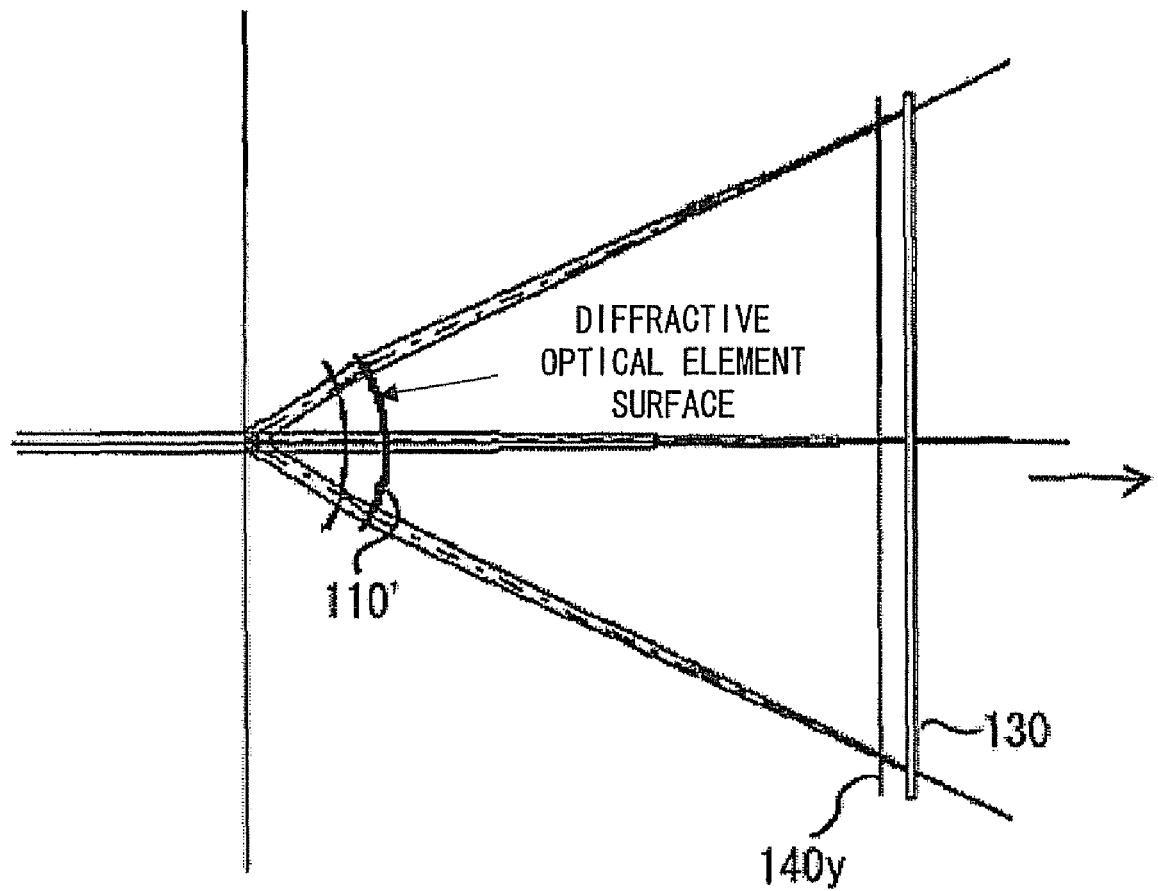
FIG. 45 is a view showing an example in which the diffractive optical element surface (indicated by a bold line) is formed on an exit surface side of the fθ lens 110' in the configuration shown in FIG. 24.

Although a combination of only refractive lenses is provided in the present embodiment, a diffractive optical element surface is further desirably added to a refractive lens surface in order to restrict a magnification chromatic aberration in the main-scanning direction, thereby a variation of a scan line length due to a wavelength variation of a plurality of beams is restricted. FIG. 44 is a view showing an example in which the diffractive optical element surface (indicated by a bold line) is formed on the exit surface side of the fθ lens 110' in the configuration shown in FIG. 13. FIG. 45 is a view showing an example in which the diffractive optical element surface (indicated by a bold line) is formed on the exit surface side of the fθ lens 110' in the configuration shown in FIG. 24.

Third Embodiment

Next, a third embodiment of the present invention will be described. The present embodiment is a modification example of the second embodiment described above, and in particular, a configuration of the optical system acting on the light flux after passing through the fθ lens is different from the second embodiment. Hereinafter, a part identical to the part which has already been described in the second embodiment will be attached with the same numerical number, and description thereof will be omitted.

Specifically, in the present embodiment, cylinder mirrors 140y to 140k having a concave surface on the incident surface side are adopted in place of the cylinder lenses 120y to 120k in the configuration of the second embodiment.

Figure 22:
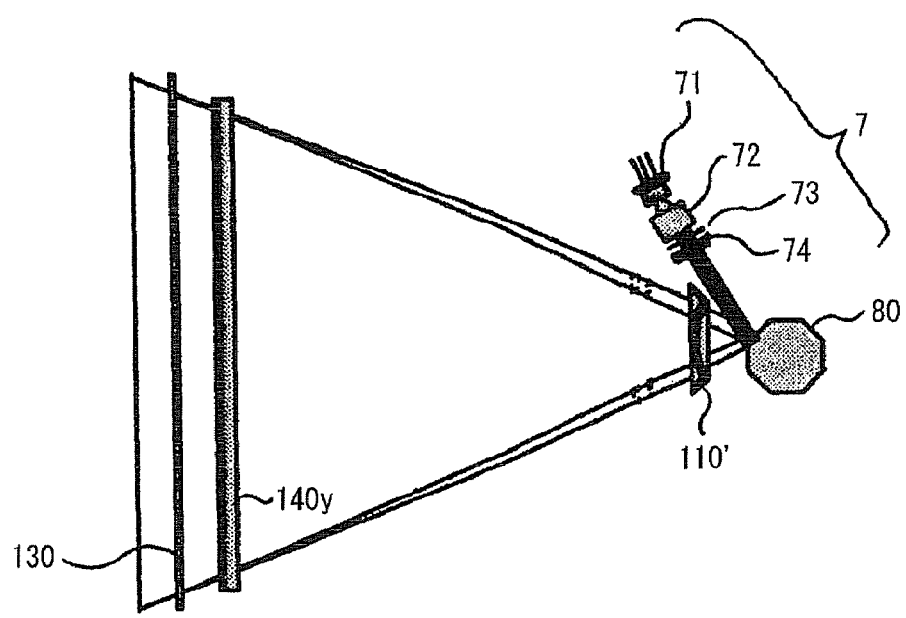
FIG. 22 is a plan view showing a configuration of the optical system in the optical scanner according to a third embodiment of the present invention in a state where turning back by the mirror is extended.
Figure 23:
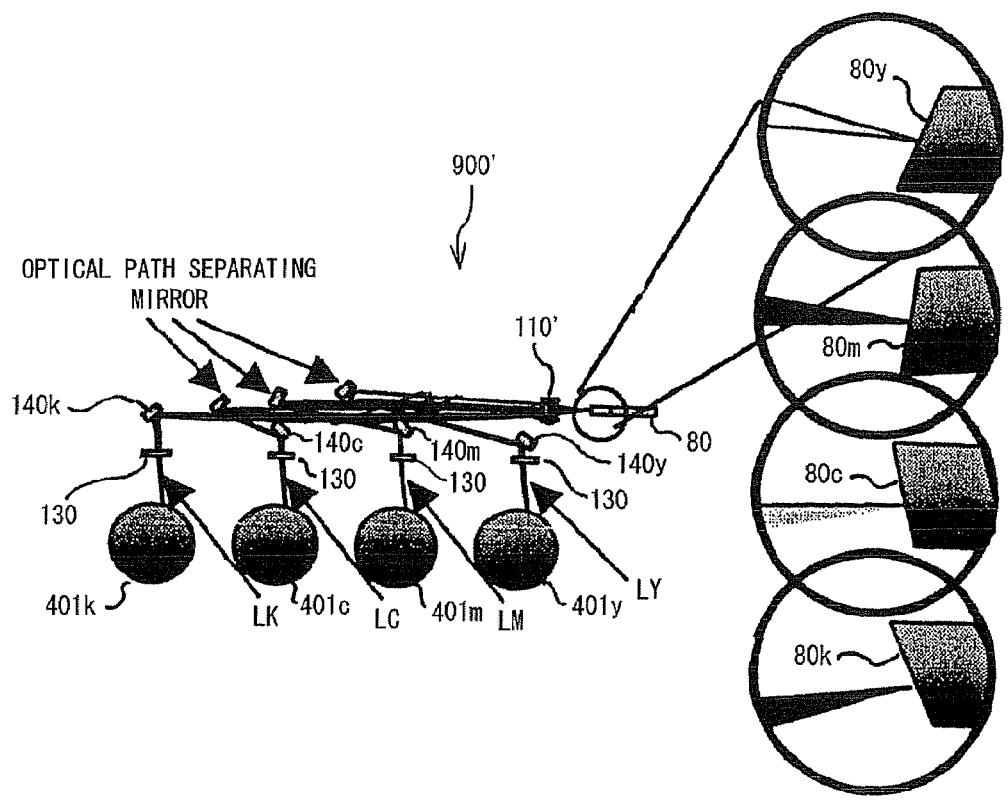
FIG. 23 is a view showing a schematic configuration of an image forming device 900 including the optical scanner according to the third embodiment.
Figure 24:
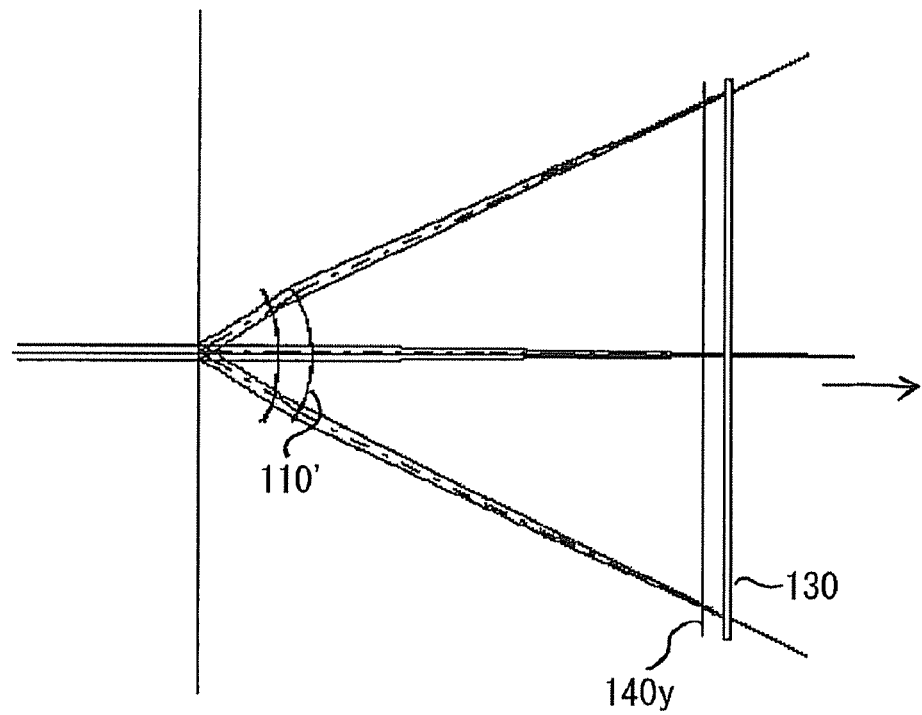
FIG. 24 is a view showing the optical path in the optical system in the optical scanner according to the third embodiment in a state where turning back by the mirror is extended.
Figure 25:
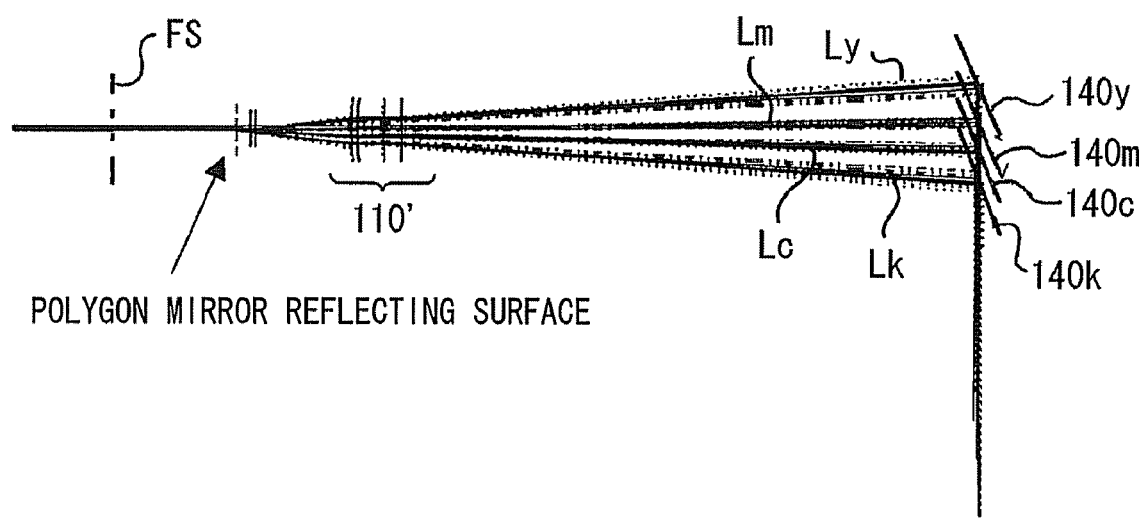
FIG. 25 is a view showing the optical path of the light flux guided to the plurality of photoconductors in the optical scanner according to the third embodiment in an enlarged manner in a sub-scanning direction in a state where turning back by the mirror is extended.
Figure 26:
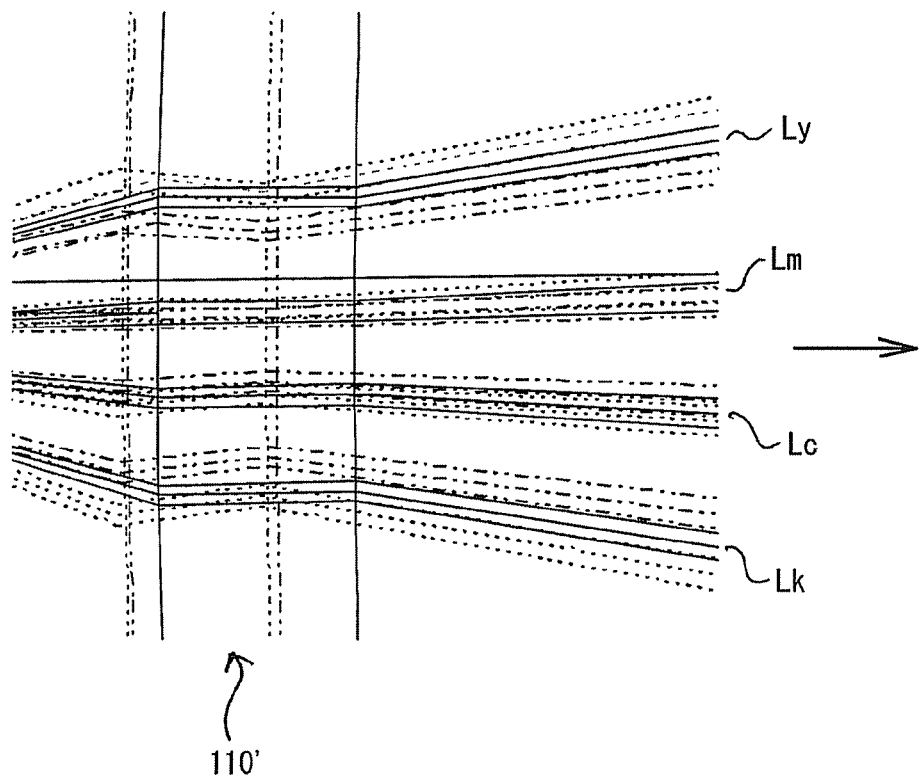
FIG. 26 is an enlarged view of the vicinity of the common (commonly-used) fθ lens in FIG. 25.

FIG. 22 is a plan view showing a configuration of the optical system of the optical scanner according to the present embodiment in a state where turning back by the mirror is extended. FIG. 23 is a view showing a schematic configuration of an image forming device 900' including the optical scanner according to the present embodiment. FIG. 24 is a plan view showing the optical path of the optical system of the optical scanner according to the present embodiment in a state where turning back by the mirror is extended. FIG. 25 is a view showing the optical path of the light flux guided by a plurality of the photoconductors in the optical scanner in an enlarged manner in the sub-scanning direction according to the present embodiment in a state where turning back by the turning back mirror is extended. FIG. 26 is an enlarged view of the vicinity of the common (commonly-used) fθ lens in FIG. 25.

Figure 27:
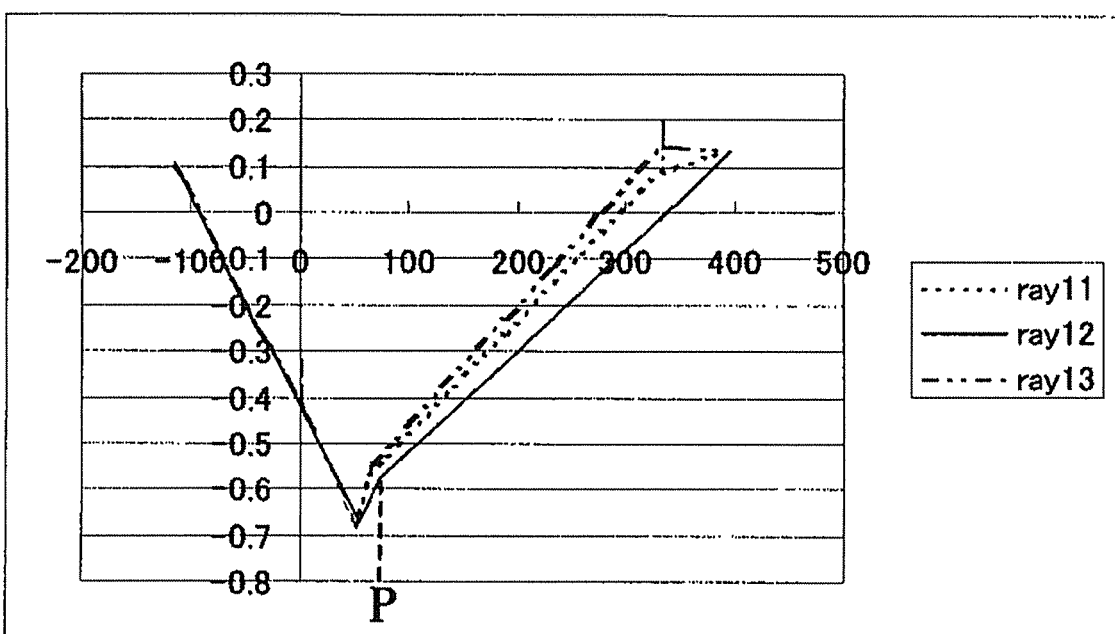
FIG. 27 is a view showing the relationship between the space (vertical axis) of the principal rays of the light fluxes from the light sources positioned on both ends among the plurality of light sources in the sub-scanning direction, and the position (horizontal axis) in the optical axis direction according to the third embodiment.
Figure 28:
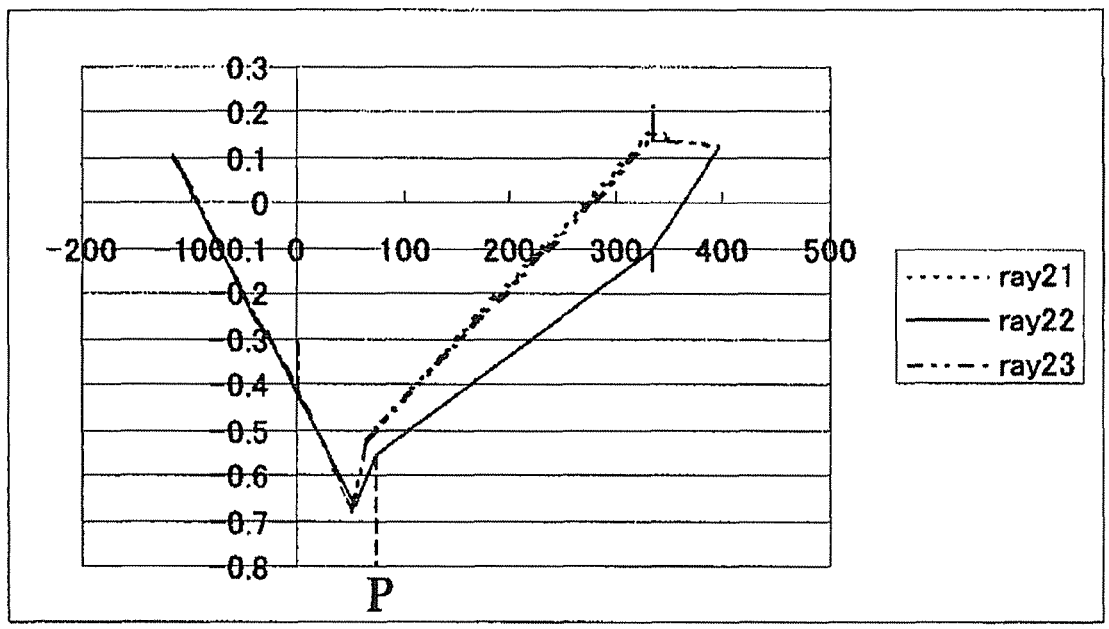
FIG. 28 is a view showing the relationship between the space (vertical axis) of the principal rays of the light fluxes from the light sources positioned on both ends among the plurality of light sources in the sub-scanning direction, and the position (horizontal axis) in the optical axis direction according to the third embodiment.
Figure 29:
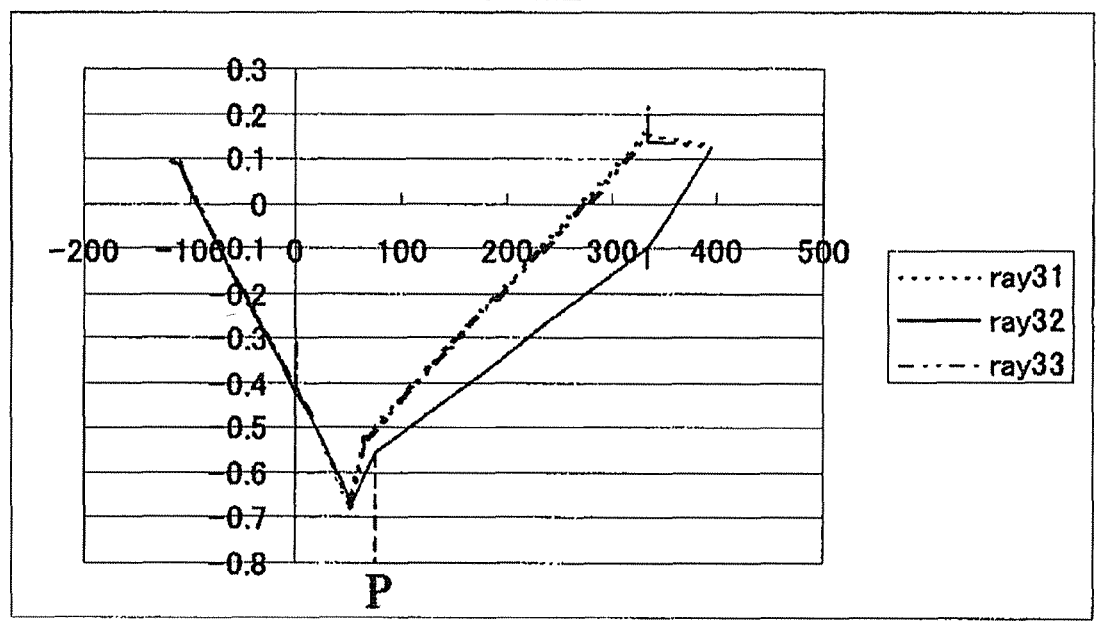
FIG. 29 is a view showing the relationship between the space (vertical axis) of the principal rays of the light fluxes from the light sources positioned on both ends among the plurality of light sources in the sub-scanning direction, and the position (horizontal axis) in the optical axis direction according to the third embodiment.
Figure 30:
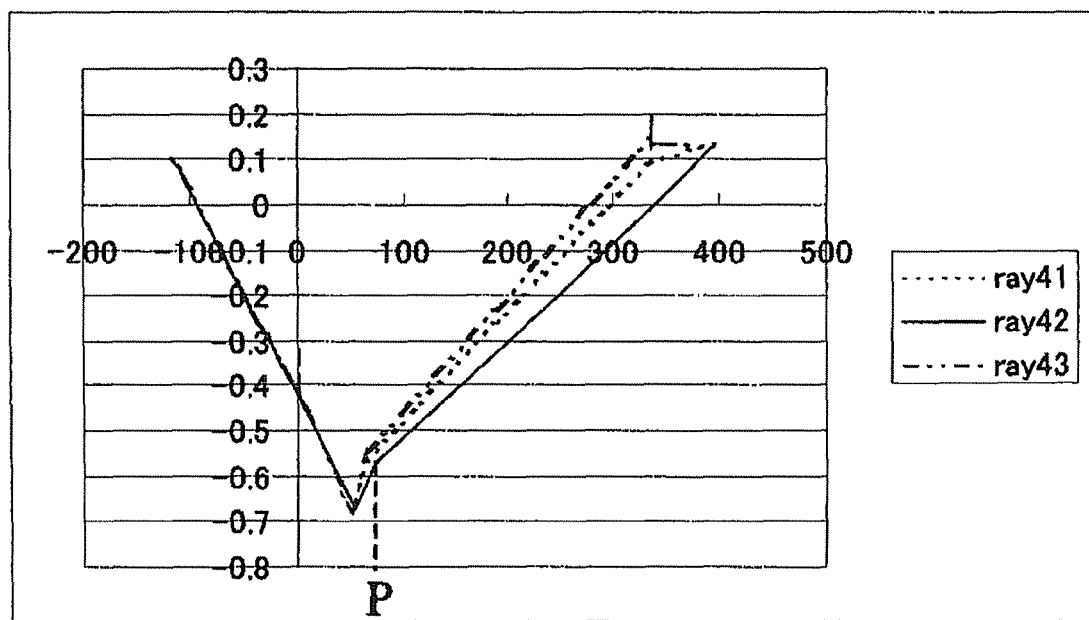
FIG. 30 is a view showing the relationship between the space (vertical axis) of the principal rays of the light fluxes from the light sources positioned on both ends among the plurality of light sources in the sub-scanning direction, and the position (horizontal axis) in the optical axis direction according to the third embodiment.
Figure 31:
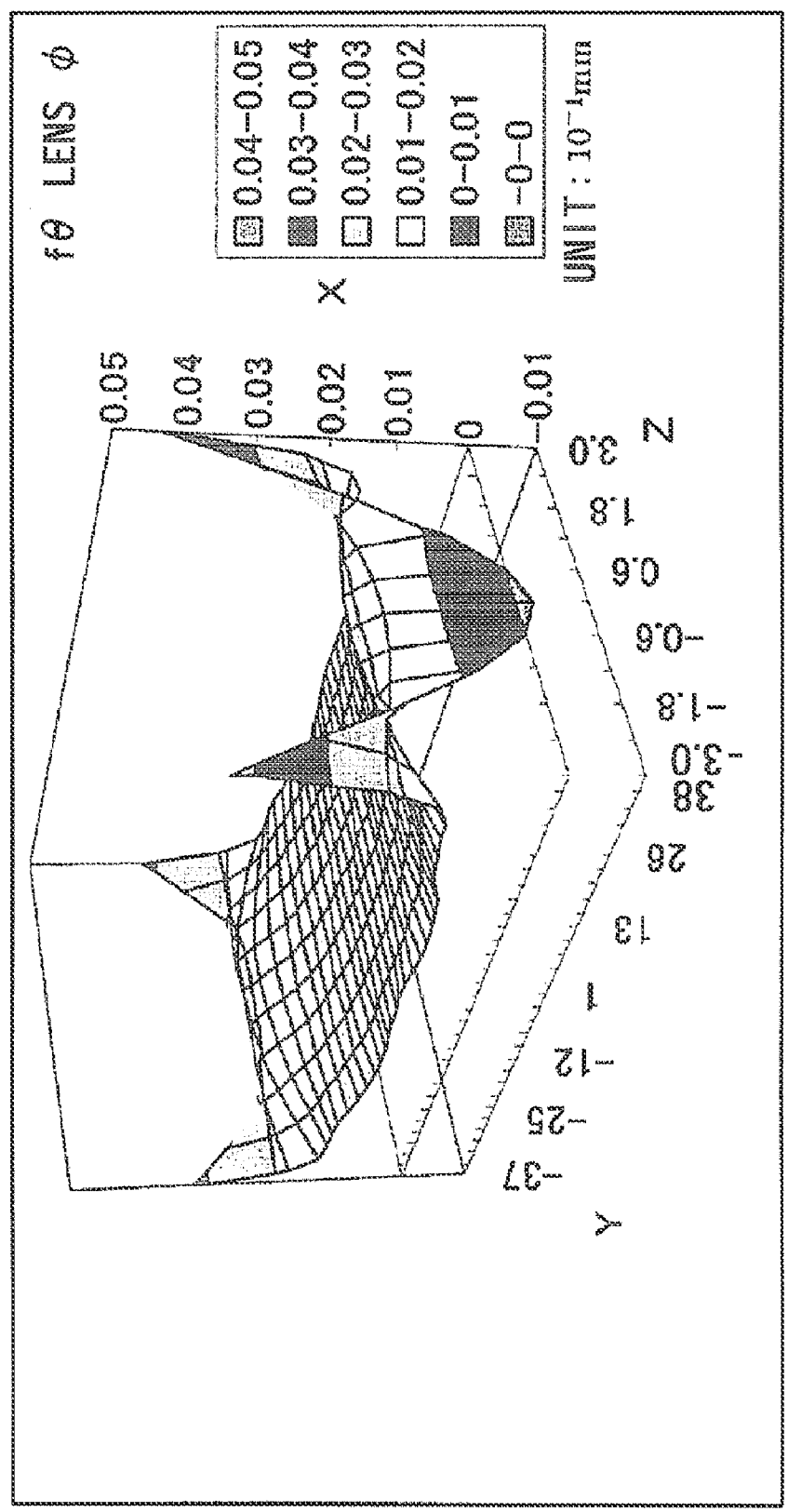
FIG. 31 is a view showing a power distribution of an fθ lens 110' in the sub-scanning direction according to the third embodiment.

FIGS. 27 to 30 show a relationship between space between the principal rays (hereinafter referred to as the distance between the principal rays) (vertical axis) of the light flux from the light sources (here, the first light source and the fourth light source) positioned on both ends in the sub-scanning direction among the plurality of light sources, and the positions in the optical axis direction (horizontal axis). In FIGS. 27 to 30, a position P shows the exit surface position of the fθ lens 110', and "0" in the horizontal axis shows a position of the reflecting surfaces of the polygon mirror 80. Here, FIG. 27 shows the light flux Ly deflected to a top position in FIG. 26, FIG. 28 shows the light flux Lm deflected to a second position from the top position in FIG. 26, FIG. 29 shows the light flux Lc deflected to a third position from the top position in FIG. 26, and FIG. 30 shows the light flux Lk deflected to a bottom position in FIG. 26. In the third embodiment, a graph showing the distance between the principal rays in the light beam passing the center position in the main-scanning direction of the fθ lens in the vicinity of the image surface increases, and the distance between the principal rays in the light flux passing through positions of both ends in the main-scanning direction of the fθ lens decreases. As shown in FIGS. 27 to 30, balance is kept between the cylinder mirror and the image surface so that the distance between the principal rays increases as the light beam approaches to the image surface in the center part in the main-scanning direction and the distance between the principal rays decreases as the light flux approaches the image surface on both of the ends, thereby a fluctuation of the distance between the principal rays when the image surface position fluctuates is further restricted than the first and the second embodiments. FIG. 31 is a view showing the power distribution in the sub-scanning direction of the fθ lens 110' in the present embodiment.

Although a combination of only the refractive lens and the mirror is provided in the present embodiment, the diffractive optical element surface is further desirably added to the refractive lens surface or the mirror surface in order to restrict the magnification chromatic aberration in the main-scanning direction, thereby a variation of positions in the main-scanning direction due to a variation of a wavelength of a plurality of beams is restricted.

Fourth Embodiment

Next, a fourth embodiment of the present invention will be described. The present embodiment is a modification example of the first embodiment described above, and in particular, a configuration of the optical system acting on the light flux after passing through the fθ lens is different from the first embodiment. Hereinafter, a part identical to the part which has already been described in the first embodiment will be attached with the same numerical number, and description thereof will be omitted.

Specifically, in the present embodiment, the cylinder mirrors 140y to 140k having a concave surface on the incident surface side are adopted in place of the cylinder lenses 120y to 120k in the configuration of the first embodiment.

Figure 32:
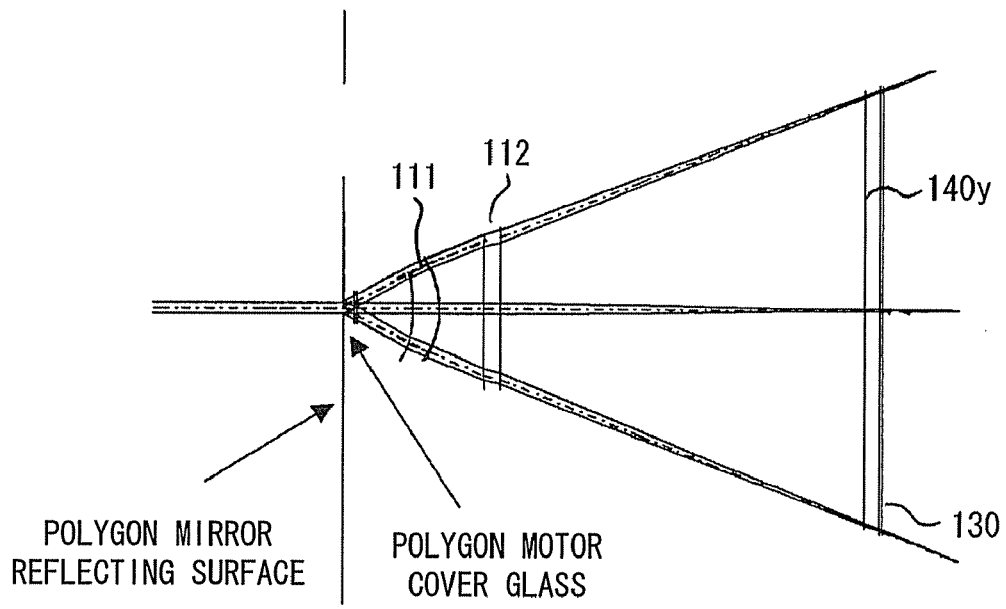
FIG. 32 is a view showing the optical path in the optical system in the optical scanner according to a fourth embodiment of the present invention in a state where turning back by the mirror is extended.
Figure 33:
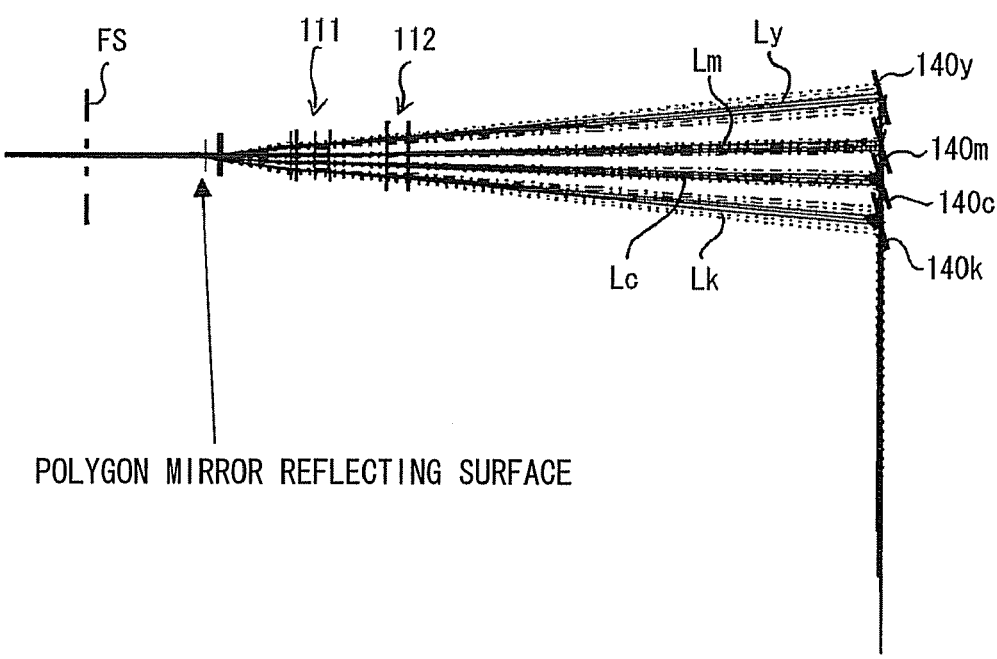
FIG. 33 is a view showing the optical path of the light flux guided to the plurality of photoconductors in the optical scanner according to the fourth embodiment in an enlarged manner in a sub-scanning direction in a state where turning back by the turning back mirror is extended.
Figure 34:
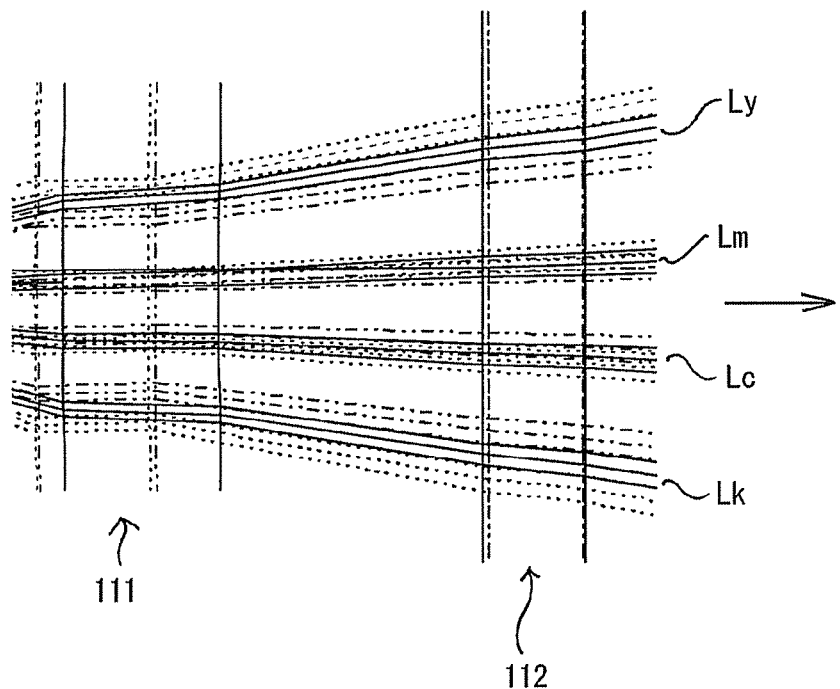
FIG. 34 is an enlarged view of the vicinity of the common (commonly-used) fθ lens in FIG. 33.

FIG. 32 is a plan view showing a configuration of the optical path in the optical system of the optical scanner according to the present embodiment in a state where turning back by the mirror is extended. FIG. 33 is a view showing the optical path of the light flux guided by a plurality of the photoconductors in the optical scanner in an enlarged manner in the sub-scanning direction according to the present embodiment in a state where turning back by the turning back mirror is extended. FIG. 34 is an enlarged view of the vicinity of the common (commonly-used) fθ lens in FIG. 33.

Figure 35:
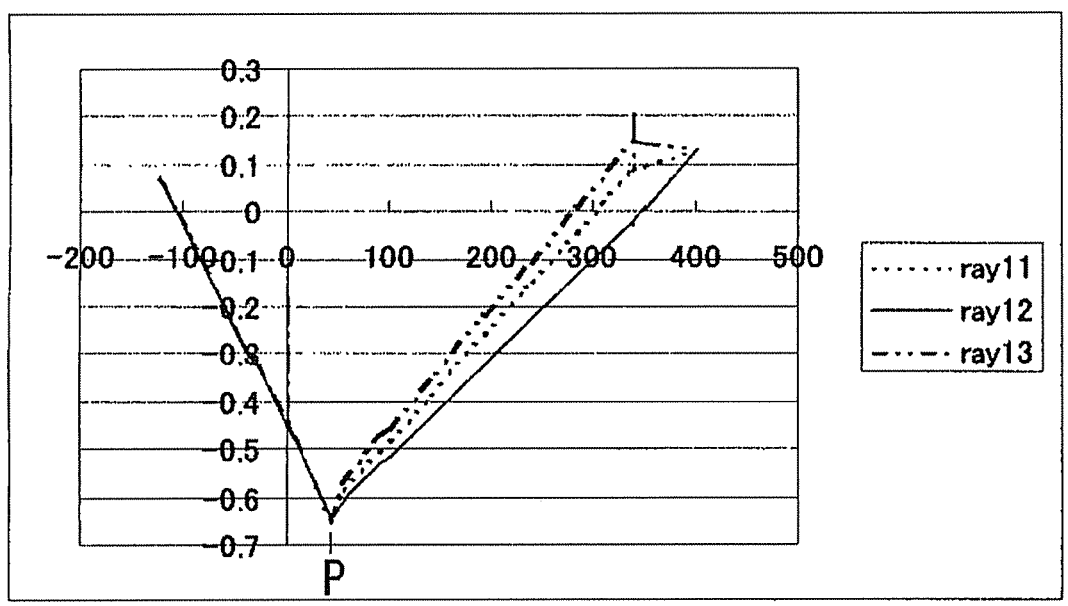
FIG. 35 is a view showing the relationship between the space (vertical axis) of the principal rays of the light fluxes from the light sources positioned on both ends among the plurality of light sources in the sub-scanning direction, and the position (horizontal axis) in the optical axis direction according to the fourth embodiment.
Figure 36:
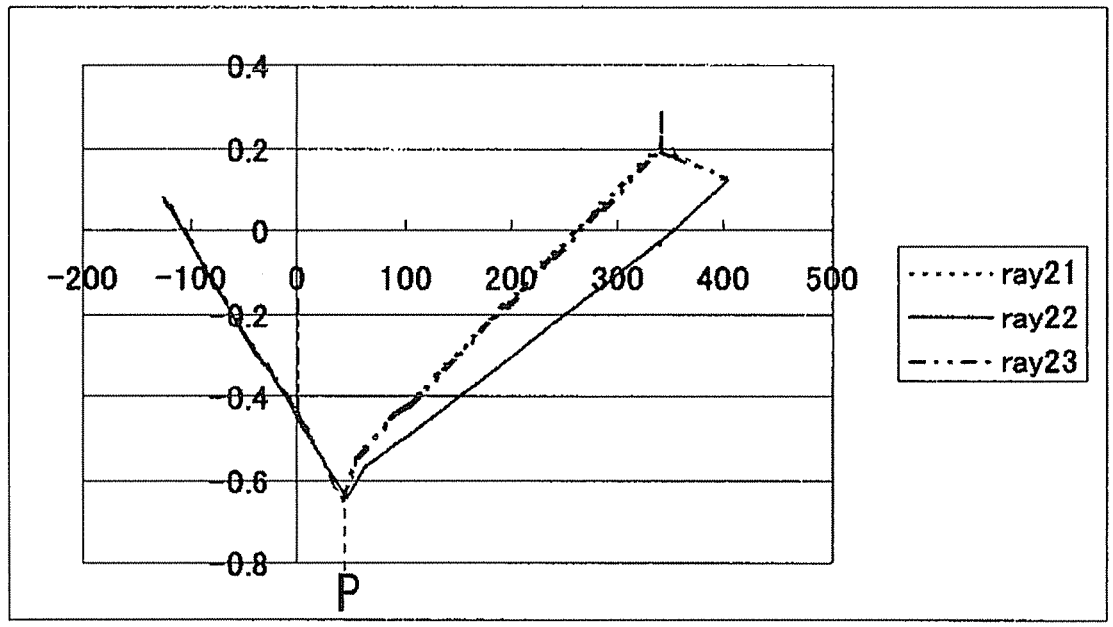
FIG. 36 is a view showing the relationship between the space (vertical axis) of the principal rays of the light fluxes from the light sources positioned on both ends among the plurality of light sources in the sub-scanning direction, and the position (horizontal axis) in the optical axis direction according to the fourth embodiment.
Figure 37:
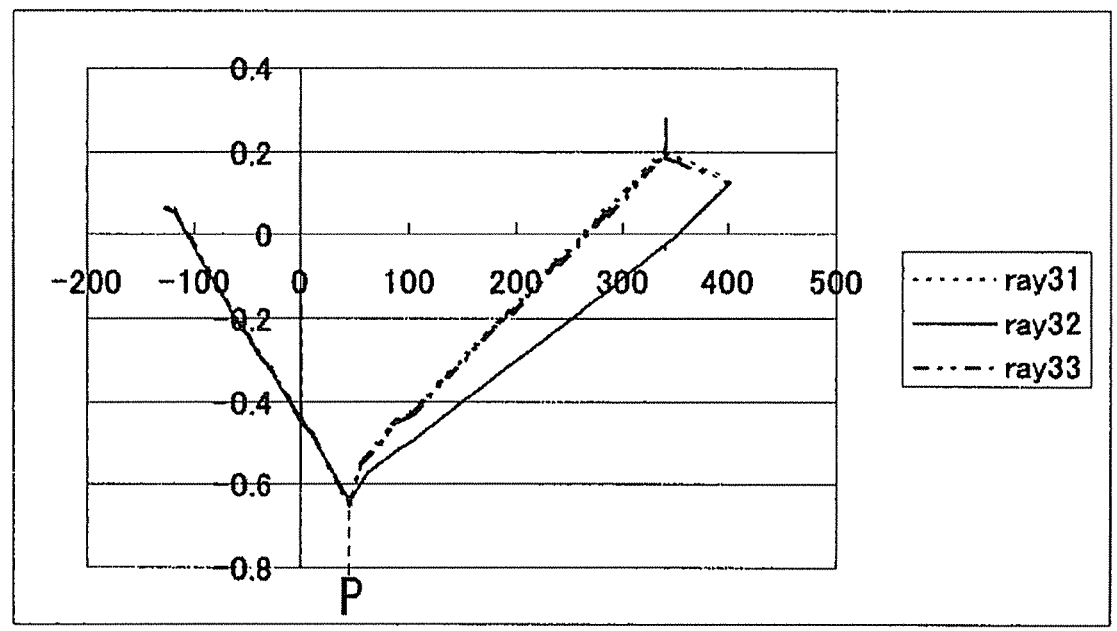
FIG. 37 is a view showing the relationship between the space (vertical axis) of the principal rays of the light fluxes from the light sources positioned on both ends among the plurality of light sources in the sub-scanning direction, and the position (horizontal axis) in the optical axis direction according to the fourth embodiment.
Figure 38:
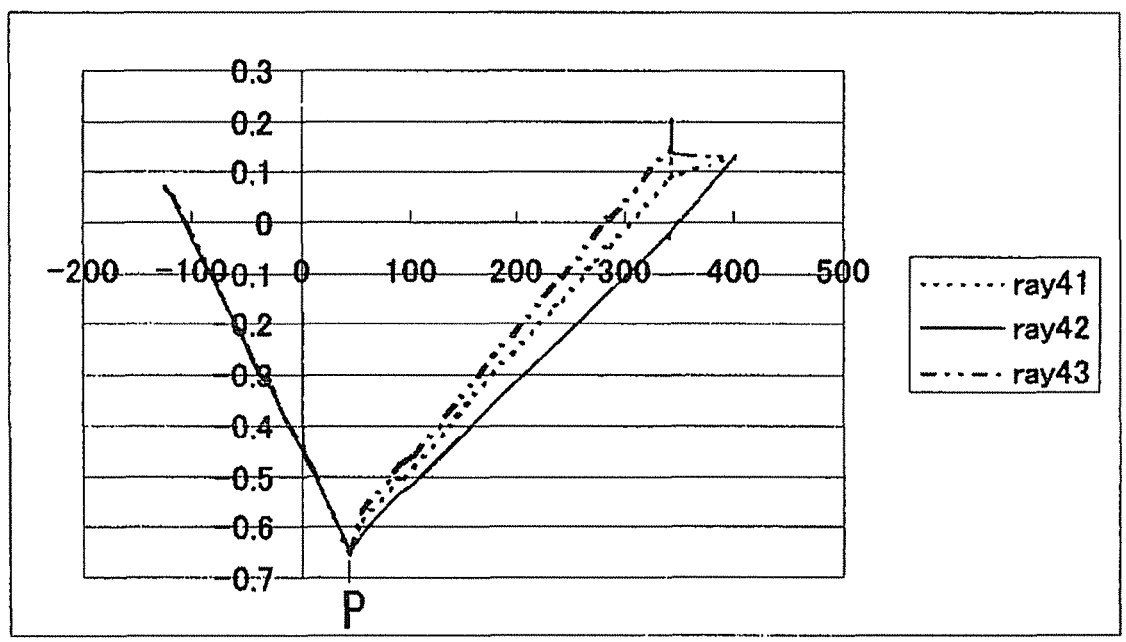
FIG. 38 is a view showing the relationship between the space (vertical axis) of the principal rays of the light fluxes from the light sources positioned on both ends among the plurality of light sources in the sub-scanning direction, and the position (horizontal axis) in the optical axis direction according to the fourth embodiment.
Figure 39:
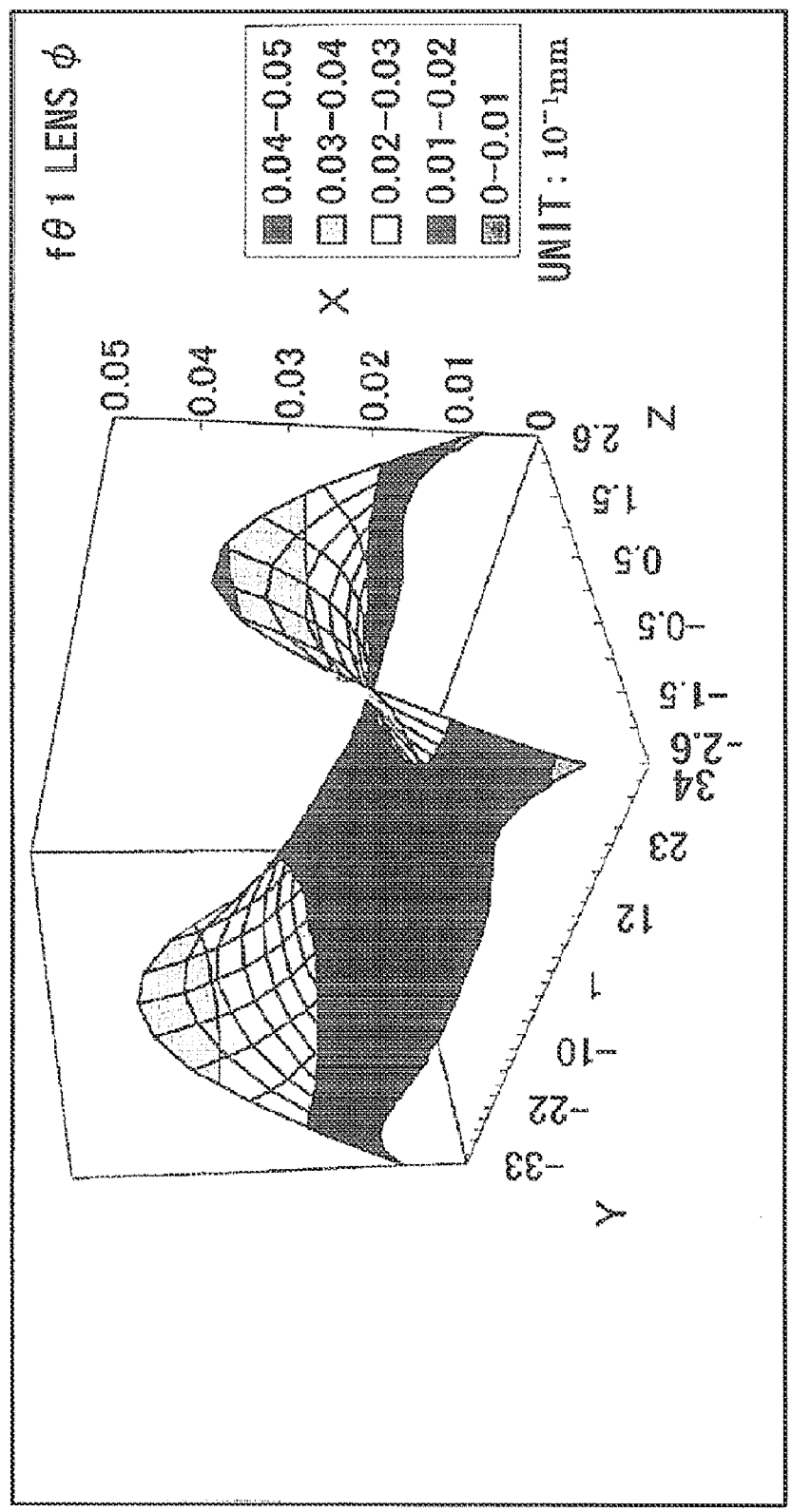
FIG. 39 is a view showing a power distribution of the fθ1 lens 111 in the sub-scanning direction according to the fourth embodiment.
Figure 40:
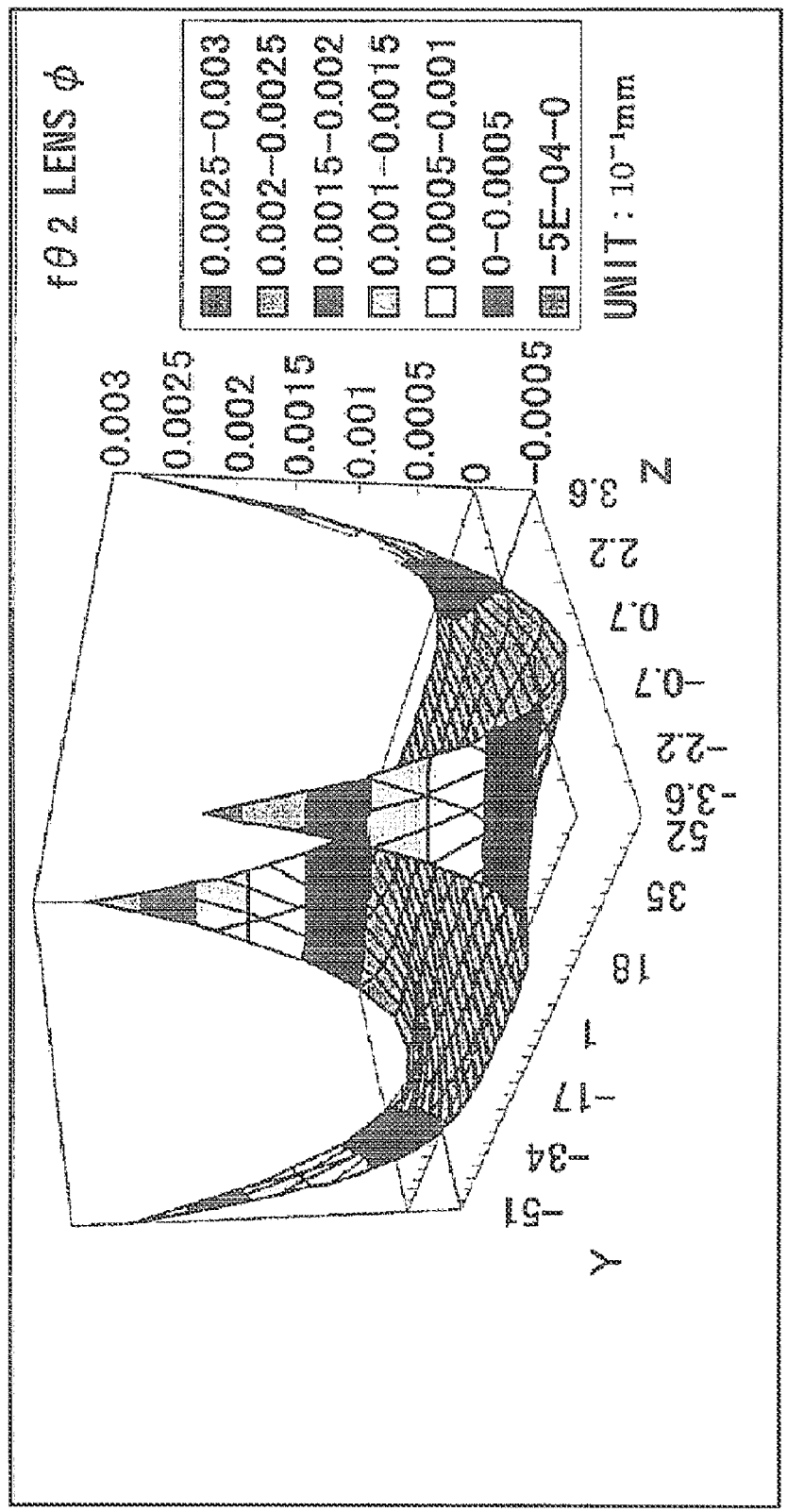
FIG. 40 is a view showing a power distribution of the fθ2 lens 112 in the sub-scanning direction according to the fourth embodiment.

FIGS. 35 to 38 show a relationship between space between the principal rays (hereinafter referred to as the distance between the principal rays) (vertical axis) of the light flux from the light sources (here, first light source and fourth light source) positioned on both ends in the sub-scanning direction among the plurality of light sources, and the positions in the optical axis direction (horizontal axis). In FIGS. 35 to 38, a position P shows the exit surface position of the fθ2 lens 112, and "0" in the horizontal axis shows a position of the reflecting surfaces of the polygon mirror 80. Here, FIG. 35 shows the light flux Ly deflected to a top position in FIG. 33, FIG. 36 shows the light flux Lm deflected to a second position from the top position in FIG. 33, FIG. 37 shows the light flux Lc deflected to a third position from the top position in FIG. 33, and FIG. 38 shows the light flux Lk deflected to a bottom position in FIG. 33. In the fourth embodiment, a graph showing the distance between the principal rays in the light beam passing the center position in the main-scanning direction of the fθ lens in the vicinity of the image surface increases, and the distance between the principal rays in the light flux passing through positions of both ends in the main-scanning direction of the fθ lens decreases. As shown in FIGS. 35 to 38, balance is kept between the cylinder mirror and the image surface so that the distance between the principal rays increases as the light beam approaches to the image surface in the center part in the main-scanning direction and the distance between the principal rays decreases as the light flux approaches to the image surface on the both ends, thereby a fluctuation of the distance between the principal rays when the image surface position fluctuates is further restricted than the first and the second embodiments. FIG. 39 is a view showing the power distribution in the sub-scanning direction of the fθ1 lens 111 in the present embodiment. FIG. 40 is a view showing the power distribution in the sub-scanning direction of the fθ2 lens 112 in the present embodiment.

FIG. 41 is a view showing a result of examining on which lens surface of the fθ1 lens and the fθ2 lens in the present embodiment a free-form surface having the power acting on all the light fluxes guided to a plurality of the photoconductors needs to be formed. In FIG. 41, the top one shows a case in which a curvature of all the lens surfaces are changed, and others show a case in which the curvature of two lens surfaces are changed, and are arranged in the order of a smaller evaluation function. The evaluation function is a sum of squares of values obtained by applying a weight on a difference between each of the optical characteristics and a target optical characteristic. Such evaluation function is desirably small. From the result shown in FIG. 41, in case the common (commonly-used) optical element as shown in the present embodiment is adopted, and when the curvatures of two lens surfaces are changed, a configuration in which the curvature of the lens surface on the polygon mirror side is changed obviously provides the most preferable optical characteristic.

Although a combination of only the refractive lens and the mirror is provided in the present embodiment, the diffractive optical element surface is further desirably added to the refractive lens surface or the mirror surface in order to restrict the magnification chromatic aberration in the main-scanning direction, thereby a variation of positions in the main-scanning direction due to a variation of a wavelength of a plurality of beams is restricted.

Although the present invention has been described with reference to a specific embodiment, a variety of changes and modifications can be made without departing from the sprit and the scope of the present invention, as obvious to one skilled in the art.

As has been described in detail above, according to the present invention, a technique capable of achieving reduction in space of allocating the optical system and improvement of the optical characteristic of the scan light in the optical scanner that scans the light flux from the light source on each of the photosensitive surface of a plurality of the photoconductors in the main-scanning direction can be provided.

What is claimed is:

1. An optical scanner that can scan a light flux from a light source to a photosensitive surface of each of a plurality of photoconductors in a main-scanning direction, comprising:
    a rotational deflector that reflects and deflects an incident light flux by a plurality of reflecting surfaces arranged corresponding to the plurality of photoconductors in a rotational direction to scan the incident light flux in the main-scanning direction, the rotational deflector in which an inclination angle of the plurality of reflecting surfaces with respect to a rotational axis of the rotational deflector is set to an angle depending on the photoconductor to which each of the reflecting surfaces corresponds;

a pre-deflection optical system that shapes the light from the light source into a light flux having a predetermined cross-sectional shape and introduces the light flux to the rotational deflector, and also converges the light flux in a sub-scanning direction in the vicinity of the reflecting surfaces of the rotational deflector; and a post-deflection optical system that introduces the light flux reflected and deflected by each of the plurality of reflecting surfaces in the rotational deflector to the photosensitive surface of the photoconductor corresponding to each of the reflecting surfaces, the post-deflection optical system includes a common (commonly-used) optical element that applies power to the light flux reflected and deflected by the rotational deflector and introduced to each of the plurality of photoconductors, so as to make the light flux introduced to the photosensitive surface by the post-deflection optical system to have a predetermined optical characteristic on the photosensitive surface depending on an incident position of the light flux and a plurality of optical elements that are arranged on an optical path between the common (commonly-used) optical element and each of the plurality of photoconductors corresponding to each of the photoconductors, each of the plurality of optical elements having a positive power in a sub-scanning direction set depending on the corresponding photoconductors.

2. The optical scanner according to claim 1, wherein the predetermined optical characteristic is at least any of a beam diameter of the light flux, a degree of curvature of the scan line, and a position of the light flux with respect to a scanning range.

3. The optical scanner according to claim 1, wherein a focal point of the common (commonly used) optical element on a side of the rotational defector is positioned on a side where the rotational axis of the rotational deflector is arranged rather than a side where the reflecting surfaces of the rotational deflector are arranged in an optical axis direction of the common (commonly-used) optical element.

4. The optical scanner according to claim 1, wherein the power in a range at least from an optical axis position to a position where a principal ray of the light flux from the light source passes in a sub-scanning direction of the common (commonly-used) optical element is set to be larger at an external side than at a center position in the main-scanning direction.

5. The optical scanner according to claim 1, wherein the power in a sub-scanning direction of the common (commonly-used) optical element is set to be weaker at an external side than at a center position in the sub-scanning direction.

6. The optical scanner according to claim 1, wherein the common (commonly-used) optical element includes a plurality of lenses arranged in an optical axis direction, and at least any of lens surfaces of at least any lens of the plurality of lenses applies power to a light flux reflected and deflected by the rotational deflector and introduced to each of the plurality of photoconductors, so as to make the light flux introduced to the photosensitive surface by the post-deflection optical system to have a predetermined optical characteristic on the photosensitive surface depending on an incident position of the light flux.

7. The optical scanner according to claim 1, wherein the pre-deflection optical system shapes the light from a plurality of the light sources into the light fluxes having a predetermined cross-sectional shape and introduces the light fluxes to the rotational deflector, and also crosses the light fluxes from the plurality of light sources in a sub-scanning direction at a position nearer to a side of an upstream in an advancing direction of the light flux than to the reflecting surfaces of the rotational deflector.

8. The optical scanner according to claim 1, wherein the plurality of optical elements are arranged at positions where the optical elements are made eccentric to an optical axis side of the common (commonly-used) optical element relative to incident light.

9. An image forming device comprising:

the optical scanner described in any one of claims 1 to 7 and 8;

a photoconductor that has an electrostatic latent image formed thereon by a light flux scanned by the optical scanner; and a developing unit that develops the electrostatic latent image formed on the photoconductor.

10. An optical scanning method that scans a light flux from a light source to a photosensitive surface of each of a plurality of photoconductors in a main-scanning direction, comprising:

shaping the light from the light source into a light flux having a predetermined cross-sectional shape to introduce the light flux to the rotational deflector, and also converging the light flux in a sub-scanning direction in the vicinity of the reflecting surfaces of the rotational deflector;

reflecting and deflecting an incident light flux by means of the rotational deflector which has a plurality of reflecting surfaces arranged corresponding to the plurality of photoconductors in a rotational direction, and in which an inclination angle of the plurality of reflecting surfaces with respect to a rotational axis of the rotational deflector is set to an angle depending on the photoconductor to which each of the reflecting surfaces corresponds, to scan the incident light flux in the main-scanning direction; and applying power to the light flux reflected and deflected by the rotational deflector and introduced to each of the plurality of photoconductors by means of a common (commonly-used) optical element so as to make the light flux introduced to the photosensitive surface to have a predetermined optical characteristic on the photosensitive surface depending on an incident position of the light flux, applying positive power in a sub-scanning direction set depending on the corresponding photoconductors to the light flux to which the power is applied by the common (commonly-used) optical element by a plurality of optical elements that are arranged on an optical path between the common (commonly-used) optical element and each of the plurality of photoconductors corresponding to each of the photoconductors, and introducing the light flux to which the power is applied by the plurality of optical elements to the photosensitive surface of the photoconductor corresponding to each of the reflecting surfaces.

11. The optical scanning method according to claim 10, wherein the predetermined optical characteristic is at least any of a beam diameter of the light flux, a degree of curvature of the scan line, and a position of the light flux with respect to a scanning range.

12. The optical scanning method according to claim 10, wherein a focal point of the common (commonly used) optical element on a side of the rotational deflector is positioned on a side where the rotational axis of the rotational deflector is arranged rather than a side where the reflecting surfaces of the rotational deflector are arranged in an optical axis direction of the common (commonly-used) optical element.

13. The optical scanning method according to claim 10, wherein
the power in a range at least from an optical axis position to a position where a principal ray of the light flux from the light source passes in a sub-scanning direction of the common (commonly-used) optical element is set to be larger at an external side than at a center position in the main-scanning direction.

14. The optical scanning method according to claim 10, wherein
the power in a sub-scanning direction of the common (commonly-used) optical element is set to be smaller at an external side than at a center position in the sub-scanning direction.

15. The optical scanning method according to claim 10, wherein
the common (commonly-used) optical element includes a plurality of lenses arranged in an optical axis direction, and
at least any of lens surfaces of at least any lens of the plurality of lenses applies power to a light flux reflected and deflected by the rotational deflector and introduced to each of the plurality of photoconductors, so as to make the light flux introduced to the photosensitive surface by the post-deflection optical system to have a predetermined optical characteristic on the photosensitive surface depending on an incident position of the light flux.

16. The optical scanning method according to claim 10, wherein
the pre-deflection optical system shapes the light from a plurality of the light sources into the light flux having a predetermined cross-sectional shape and introduces the light flux to the rotational deflector, and also crosses the light flux from the plurality of light sources in a sub-scanning direction at a position nearer to a side of an upstream in an advancing direction of the light flux than to the reflecting surfaces of the rotational deflector.

17. The optical scanning method according to claim 10, wherein
the plurality of optical elements are arranged at positions where the optical elements are made eccentric to an optical axis side of the common (commonly-used) optical element relative to incident light.

18. The optical scanner according to claim 1, wherein
the post-deflection optical system includes a diffractive optical element having power at least in any of the main-scanning direction and a sub-scanning direction.

* * * * *